United States Patent
Seguchi et al.

(10) Patent No.: US 9,391,480 B2
(45) Date of Patent: Jul. 12, 2016

(54) ROTATING ELECTRIC MACHINE

(71) Applicant: DENSO CORPORATION, Kariya, Aichi-pref. (JP)

(72) Inventors: Masahiro Seguchi, Obu (JP); Shinsuke Sugiura, Nishio (JP); Hideaki Suzuki, Toyoake (JP); Hideyuki Yagi, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 315 days.

(21) Appl. No.: 14/142,425

(22) Filed: Dec. 27, 2013

(65) Prior Publication Data
US 2014/0184012 A1    Jul. 3, 2014

(30) Foreign Application Priority Data

Dec. 27, 2012  (JP) .................................. 2012-286330
Dec. 20, 2013  (JP) ................................. 2013-264361

(51) Int. Cl.
*H02K 3/04* (2006.01)
*H02K 3/50* (2006.01)
*H02K 3/38* (2006.01)

(52) U.S. Cl.
CPC ... *H02K 3/50* (2013.01); *H02K 3/38* (2013.01)

(58) Field of Classification Search
CPC .................................. H02K 3/50; H02K 3/38
USPC ......... 310/201, 202, 203, 204, 205, 206, 207, 310/208, 43
See application file for complete search history.

(56) References Cited

U.S. PATENT DOCUMENTS

| 5,965,263 | A | 10/1999 | Tatematsu et al. | |
| 6,333,573 | B1 * | 12/2001 | Nakamura | H02K 3/24 29/596 |
| 6,809,437 | B2 * | 10/2004 | Oohashi | H02K 3/24 310/201 |
| 8,008,880 | B2 * | 8/2011 | Suzuki | H02P 21/145 318/400.02 |

FOREIGN PATENT DOCUMENTS

| JP | 57-36815 | 2/1982 |
| JP | 10-247422 | 9/1998 |
| JP | 3144157 | 1/2001 |
| JP | 2005-304223 | 10/2005 |

OTHER PUBLICATIONS

Japanese Office Action (2 pages), dated Mar. 31, 2015, issued in corresponding Japanese Patent Application No. 2013-264361 and English translation (2 pages).

* cited by examiner

*Primary Examiner* — Hanh Nguyen
(74) *Attorney, Agent, or Firm* — Nixon & Vanderhye PC

(57) ABSTRACT

A rotating electric machine includes a rotor, a stator and an Insulating resin. The stator includes a stator core and a stator coil that is partially received in slots of the stator core so as to have a pair of coil end parts protruding outside of the slots respectively on opposite axial sides of the stator core. The stator coil is formed of a plurality of electric wire segments, each of which includes an electric conductor and an Insulating coat that covers an outer surface of the electric conductor. The insulating resin is applied to the coil end parts of the stator coil so as to cover the outer surfaces of the insulating coats of the electric wire segments forming the stator coil. Further, a tensile strength of the insulating coats of the electric wire segments is higher than an adhesion strength between the insulating resin and the insulating coats.

9 Claims, 16 Drawing Sheets

(1ST EMBODIMENT)

TENSILE STRENGTH OF INSULATING COATS 25 > ADHESION STRENGTH BETWEEN VARNISH 27 AND INSULATING COATS 25

(1ST EMBODIMENT)

(1ST COMPARATIVE EXAMPLE)

(2ND EMBODIMENT)

(2ND COMPARATIVE EXAMPLE)

(3RD EMBODIMENT)

(3RD COMPARATIVE EXAMPLE)

(4TH EMBODIMENT)

(4TH COMPARATIVE EXAMPLE)

(5TH EMBODIMENT)

(5TH COMPARATIVE EXAMPLE)

(6TH EMBODIMENT)

(6TH COMPARATIVE EXAMPLE)

(7TH EMBODIMENT)

(7TH COMPARATIVE EXAMPLE)

(8TH EMBODIMENT)

(8TH COMPARATIVE EXAMPLE)

(9TH EMBODIMENT)

(9TH COMPARATIVE EXAMPLE)

(10TH EMBODIMENT)

(10TH COMPARATIVE EXAMPLE)

(11TH EMBODIMENT)

(11TH COMPARATIVE EXAMPLE)

(1ST MODIFICATION)

(1ST MODIFICATION)

(2ND MODIFICATION)

ROTATING ELECTRIC MACHINE

CROSS-REFERENCE TO RELATED APPLICATIONS

This application is based on and claims priority from Japanese Patent Applications No. 2012-286330 filed on Dec. 27, 2012 and No. 2013-264361 filed on Dec. 20, 2013, the contents of which are hereby incorporated by reference in their entireties into this application.

BACKGROUND

1 Technical Field

The present invention relates to rotating electric machines that are used in, for example, motor vehicles as electric motors and electric generators.

2 Description of Related Art

There are known rotating electric machines that are used in motor vehicles as electric motors and electric generators. Those rotating electric machines generally include a rotor and a stator. The stator includes a stator core disposed in radial opposition to the rotor and a stator coil mounted on the stator core. The stator coil is formed by connecting a plurality of electric wires in a predetermined pattern; each of the electric wires has an insulating coat formed on its surface. Moreover, the stator coil has an in-slot part received in slots of the stator core and first and second coil end parts protruding outside of the slots respectively from opposite axial end faces of the stator core. Furthermore, to ensure resistance to vibration, the stator coil is fixed by applying insulating resin, such as a varnish, to the first and second coil end parts.

Moreover, Japanese Patent No. 3144157 discloses a stator for a permanent-magnet electric generator. The stator includes an armature core, a plurality of armature wires mounted on the armature core, and a plurality of bridging wires that connect the armature wires to one another. The stator also includes first, second and third insulating layers. The first insulating layer is formed so as to cover an outer surface of a yoke portion of the armature core. Further, on the first insulating layer, there are arranged the bridging wires. The second insulating layer is formed on the first insulating layer so as to cover the bridging wires. The third insulating layer is formed so as to cover the second insulating layer as well as the first insulating layer. Furthermore, the second insulating layer is formed of either a resin that is not adhesive to both the first and third insulating layers or a resin that has a weak adhesive property to both the first and third insulating layers. Consequently, both the adhesion strength between the first and second insulating layers and the adhesion strength between the second and third insulating layers are low. As a result, when cracks are generated in the first or the third insulating layer, it is possible to prevent application of a large stress to the bridging wires, thereby preventing breakage of the bridging wires.

Furthermore, the inventors of the present invention have found the following problems with the above-described known rotating electric machines.

When a varnish is applied to the first and second coil end parts of the stator coil, the varnish is filled into gaps formed between the electric wires to adhere to the electric wires. Moreover, the varnish has a lower coefficient of linear expansion than the insulating coats of the electric wires forming the stator coil. Consequently, when operation of the rotating electric machine is stopped and thus the ambient temperature of the stator is changed from a high temperature to a low temperature, tensile stress will be induced in the varnish. The tensile stress increases with decrease in the temperature of the varnish, as shown in FIG. 36. When the tensile stress has increased to exceed an allowable stress, cracks will be generated in the varnish. Further, in cases where the adhesion strength between the varnish and the insulating coats of the electric wires is higher than the tensile strength of the insulating coats, when the cracks have advanced to the boundaries between the varnish and the insulating coats, the cracks will cause the Insulating coats to be also cracked together with the varnish, resulting in a puncture or breakdown of the insulating coats. In particular, in cases where the rotating electric machine is configured to cool the stator coil with a coolant, the temperature of the varnish will be decreased more rapidly upon stop of operation of the rotating electric machine, thereby making it easier for a puncture of the insulating coats to occur.

SUMMARY

According to an exemplary embodiment, a first rotating electric machine is provided which includes a rotor, a stator and an insulating resin. The stator includes a stator core and a stator coil mounted on the stator core. The stator core has a plurality of slots formed therein. The stator coil is partially received in the slots of the stator core so as to have a pair of coil end parts protruding outside of the slots respectively on opposite axial sides of the stator core. The stator coil is formed of a plurality of electric wire segments that are connected to one other. Each of the electric wire segments includes an electric conductor and an insulating coat that covers an outer surface of the electric conductor. The insulating resin is applied to the coil end parts of the stator coil so as to cover the outer surfaces of the insulating coats of the electric wire segments forming the stator coil. Further, a tensile strength of the Insulating coats of the electric wire segments is higher than an adhesion strength between the insulating resin and the Insulating coats.

With the above configuration, when the ambient temperature of the stator is changed with a change in operation of the first rotating electric machine and cracks are generated in the insulating resin due to the change in the ambient temperature, the cracking stress will act in such a manner as to separate the insulating resin from the Insulating coats of the electric wire segments. Consequently, the cracks generated in the Insulating resin are prevented from advancing to the insulating coats of the electric wire segments. That is, the insulating coats are prevented from being cracked along with the insulating resin; thus the cracks generated in insulating resin are prevented from reaching the electric conductors of the electric wire segments. As a result, it is possible to reliably prevent a puncture of the insulating coats from occurring.

In the first rotating electric machine, each of the insulating coats of the electric wire segments may be configured to include a plurality of layers each having a particular tensile strength. In this case, at least one of the tensile strengths of the layers is higher than the adhesion strength between the insulating resin and the insulating coats. Further, in this case, it is preferable that for each adjacent pair of the layers of the insulating coats of the electric wire segments, the tensile strength of that one of the two layers of the pair which is formed inside of the other layer is higher than an adhesion strength between the two layers of the pair.

In the first rotating electric machine, each of the electric wire segments forming the stator coil may have a substantially rectangular cross-sectional shape.

In the first rotating electric machine, the stator coil may be mounted on the stator core in a distributed winding manner.

According to another exemplary embodiment, a second rotating electric machine is provided which includes a rotor, a stator and an insulating resin. The stator includes a stator core and a stator coil mounted on the stator core. The stator core has a plurality of slots formed therein. The stator coil is partially received in the slots of the stator core so as to have a pair of coil end parts protruding outside of the slots respectively on opposite axial sides of the stator core. The stator coil is formed of a plurality of electric wire segments that are connected to one other. Each of the electric wire segments includes an electric conductor and an insulating coat that covers an outer surface of the electric conductor. The insulating resin is applied to the coil end parts of the stator coil so as to cover the outer surfaces of the insulating coats of the electric wire segments forming the stator coil. Further, each of the insulating coats of the electric wire segments is configured to include an inner coat and an outer coat that is formed outside of the inner coat. A tensile strength of the Inner coat is higher than an adhesion strength between the Inner and outer coats.

With the above configuration, even if cracks generated in the insulating resin reach the boundaries between the Inner and outer coats of the electric wire segments, it is possible to prevent the cracks from further advancing to the inner coats across the boundaries. Thus, the cracks are also prevented from reaching the electric conductors of the electric wire segments. As a result, it is possible to reliably prevent a puncture of the Insulating coats of the electric wire segments from occurring.

In the second rotating electric machine, the inner and outer coats may be formed of different insulating materials.

In the second rotating electric machine, each of the electric wire segments forming the stator coil may have a substantially rectangular cross-sectional shape.

In the second rotating electric machine, the stator coil may be mounted on the stator core in a distributed winding manner.

In the second rotating electric machine, at least one of the inner and outer coats may be configured to include a plurality of layers. Further, in this case, it is preferable that for each adjacent pair of the plurality of layers, the tensile strength of that one of the two layers of the pair which is formed inside of the other layer is higher than an adhesion strength between the two layers of the pair.

In addition, FIG. 11 illustrates the relationship between the tensile strengths of the insulating coats of the electric wire segments and the adhesion strengths between the insulating resin and the insulating coats, between the inner and outer coats of the insulating coats and between different layers of the insulating coats in the first and second rotating electric machines.

BRIEF DESCRIPTION OF THE DRAWINGS

The present invention will be understood more fully from the detailed description given hereinafter and from the accompanying drawings of exemplary embodiments, which, however, should not be taken to limit the Invention to the specific embodiments but are for the purpose of explanation and understanding only.

In the accompanying drawings.

DESCRIPTION OF EMBODIMENTS

Figure 1:
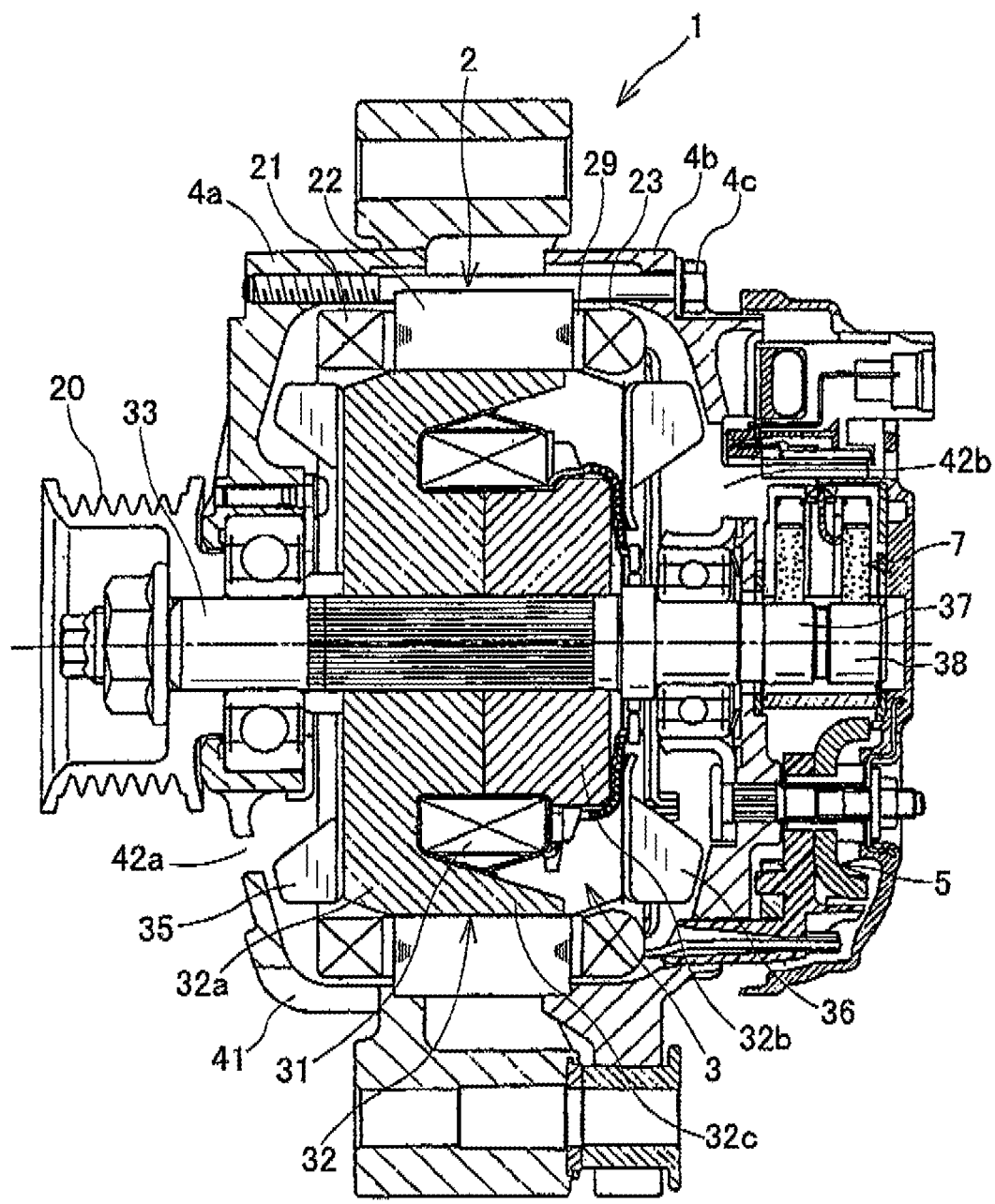
FIG. 1 is a partially cross-sectional view of a rotating electric machine according to the first embodiment.

Exemplary embodiments will be described hereinafter with reference to FIGS. 1-35. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

[First Embodiment]

FIG. 1 shows the overall configuration of a rotating electric machine according to a first embodiment.

In the present embodiment, the rotating electric machine is configured as an automotive alternator 1 for use in a motor vehicle, such as a passenger car or a truck.

As shown in FIG. 1, the alternator 1 includes: a stator 2 that functions as an armature; a rotor 3 that functions as a field; a pair of front and rear housings 4a and 4b that are connected and fixed by a plurality of bolts 4c and together accommodate both the stator 2 and the rotor 3; and a rectifier 5 that rectifies three-phase AC power outputted from the stator 2 into DC power.

Figure 2:
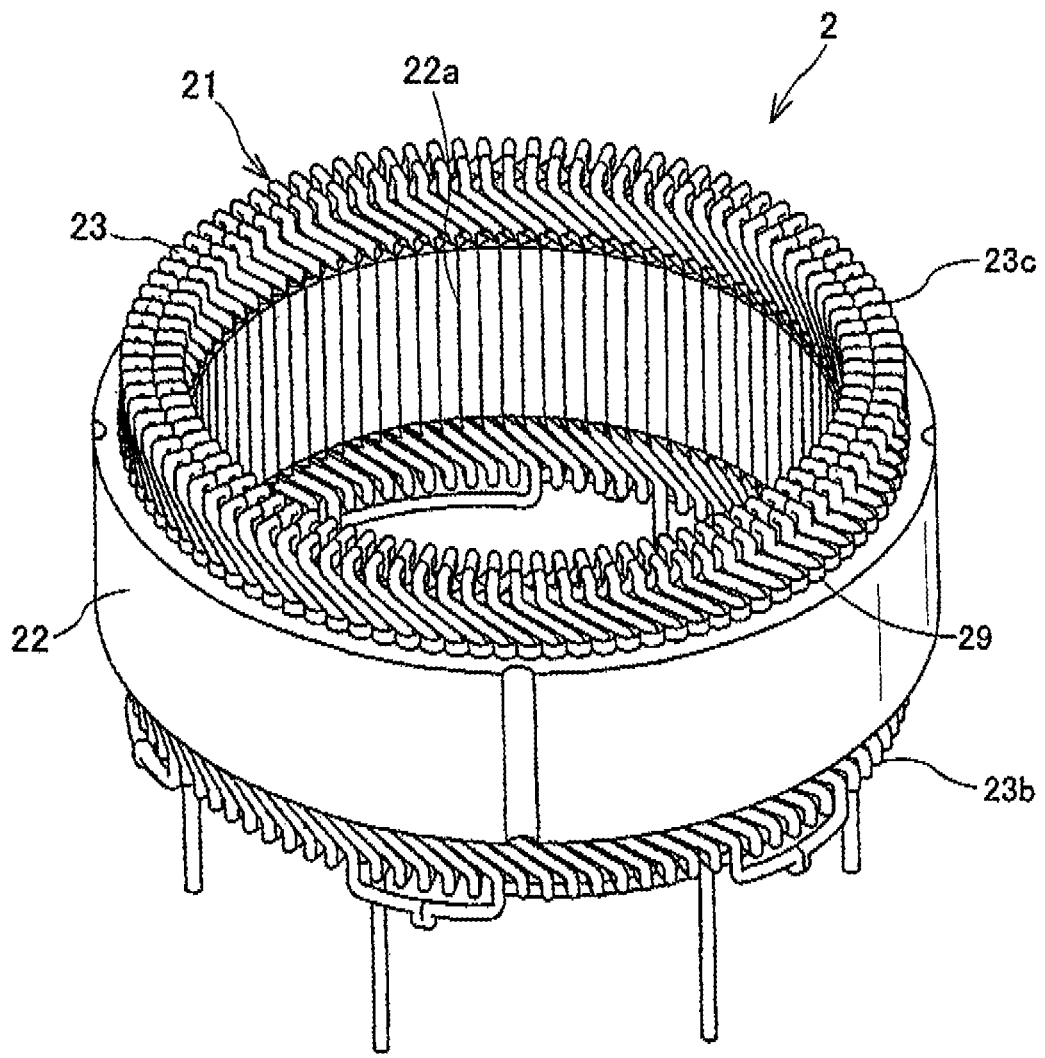
FIG. 2 is a perspective view of a stator of the rotating electric machine.

The stator 2 includes, as shown in FIG. 2, a hollow cylindrical stator core 22, a three-phase stator coil 21 mounted on the stator core 22, and insulators 29 that electrically insulate the stator coil 21 from the stator core 22. Referring back to FIG. 1, the stator 2 is held between the front and rear housings 4a and 4b, so as to surround the rotor 3 with a predetermined radial gap formed between the stator 2 and the rotor 3. The detailed configuration of the stator 2 will be described later.

The rotor 3 includes a rotating shaft 33, a rotor core 32 that is comprised of a pair of Lundell-type magnetic pole cores 32a and 32b, and a field coil 31. The rotating shaft 33 is rotatably supported by the front and rear housings 4a and 4b via bearings. The rotating shaft 33 has a pulley 20 mounted on a front end portion (i.e., a left end portion in FIG. 1) thereof, so that it can be driven by an internal combustion engine (not shown) of the vehicle via the pulley 20. Each of the magnetic pole cores 32a and 32b has a plurality of magnetic pole claws 32c. The field coil 31 is made, for example, of an insulation-treated copper wire and wound into a hollow cylindrical shape. The magnetic pole cores 32a and 32b are fixedly fitted on the rotating shaft 33 with the field coil 31 held between the magnetic pole cores 32a and 32b.

In addition, in the present embodiment, the number of the magnetic pole claws 32c of each of the magnetic pole cores 32a and 32b is equal to 8. That is, the rotor 3 has a total of sixteen magnetic poles.

Moreover, the alternator 1 further includes a mixed-flow cooling fan 35, a centrifugal cooling fan 36, a pair of slip rings 37 and 38, and a brush device 7.

The mixed-flow cooling fan 35 is fixed, for example by welding, to a front end face of the magnetic pole core 32a which is located on the front side (i.e., the left side in FIG. 1). The mixed-flow cooling fan 35 sucks cooling air from the front side and discharges the same both in the axial and radial directions of the rotating shaft 33. On the other hand, the centrifugal cooling fan 36 is fixed, for example by welding, to a rear end face of the magnetic pole core 32b which is located on the rear side (i.e., the right side in FIG. 1). The centrifugal cooling fan 36 sucks cooling air from the rear side and discharges the same in the radial direction of the rotating shaft 33.

In addition, in a front end wall of the front housing 4a, there are formed a plurality of cooling air suction openings 42a via which the cooling air is sucked into the alternator 1 by the mixed-flow cooling fan 35. On the other hand, in a rear end wall of the rear housing 4b, there are formed a plurality of cooling air suction openings 42b via which the cooling air is sucked into the alternator 1 by the centrifugal cooling fan 36. Moreover, in side walls of the front and rear housings 4a and 4b, there are formed a plurality of cooling air discharge openings 41 via which the a cooling air is discharged out of the alternator 1 by the mixed-flow and centrifugal cooling fans 35 and 36. Further, in the present embodiment, the cooling air discharge openings 41 are formed in the front and rear housings 4a and 4b so as to face those parts of the stator coil 21 which protrude from the axial end faces of the stator core 22.

The slip rings 37 and 38 are provided on a rear end portion (i.e., a right end portion in FIG. 1) of the rotating shaft 33 and respectively electrically connected to opposite ends of the field coil 31.

The brush device 7 includes a pair of brushes that are respectively arranged on the radially outer peripheries of the slip rings 37 and 38, so as to supply field current to the field coil 31 via the slip rings 37 and 38.

The automotive alternator 1 having the above-described configuration operates in the following way. When torque is transmitted from the engine to the pulley 20 via, for example, a belt (not shown), the rotor 3 is driven by the torque to rotate in a predetermined direction. During the rotation of the rotor 3, the field current is supplied to the field coil 31 through sliding contact between the slip rings 37 and 38 and the brushes of the brush device 7, thereby magnetizing the magnetic pole claws 32c of the magnetic pole cores 32a and 32b to create a rotating magnetic field. The rotating magnetic field induces the three-phase AC power in the stator coil 21. Then, the rectifier 5 rectifies the three-phase AC power outputted from the stator coil 21 into the DC power and outputs the obtained DC power via output terminals thereof.

After having described the overall configuration and operation of the alternator 1, the detailed configuration of the stator 2 of the alternator 1 will be described with reference to FIGS. 2-10.

Figure 5:
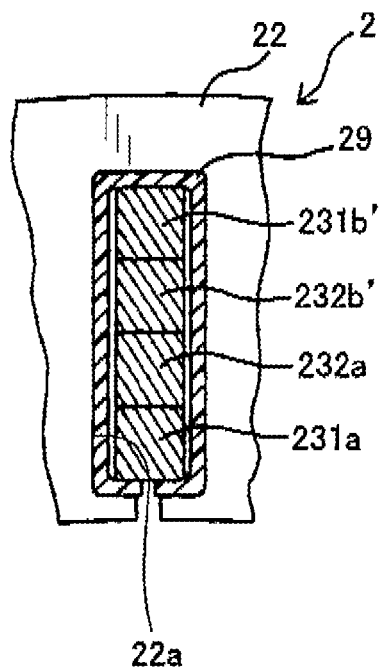
FIG. 5 is a partially cross-sectional view of part of the stator.

In the stator core 22, there are formed a plurality of slots 22a for receiving the stator coil 21. As shown in FIG. 5, each of the slots 22a has a substantially rectangular cross section perpendicular to the axial direction of the stator core 22. In the present embodiment, there are provided two slots 22a per magnetic pole of the rotor 3 that has the sixteen magnetic poles and per phase of the three-phase stator coil 21. Accordingly, the total number of the slots 22a formed in the stator core 22 is equal to 96 (i.e., 2×16×3). In addition, the slots 22a are spaced from so one another in the circumferential direction of the stator core 22 at equal intervals.

In the present embodiment, the stator coil 21 is mounted on the stator core 22 in a distributed winding manner.

Figure 6:
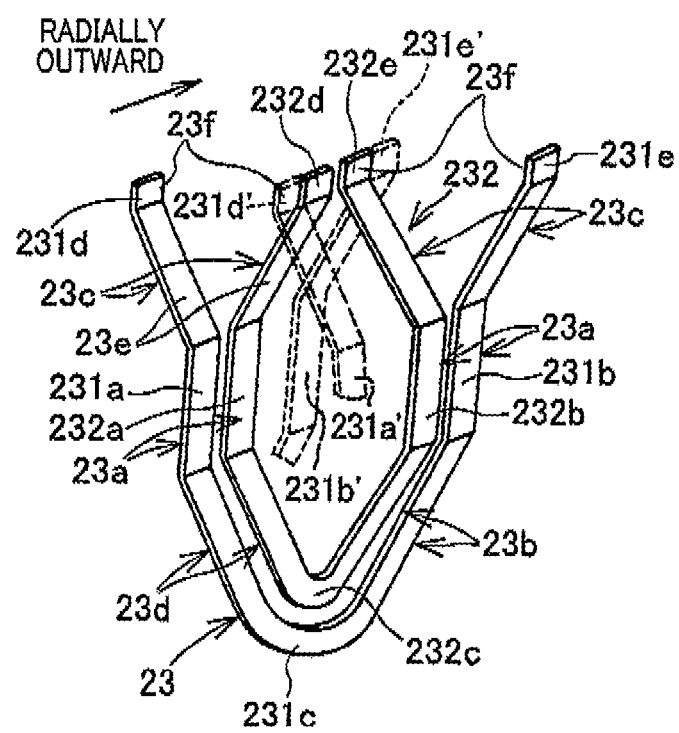
FIG. 6 is a schematic perspective view illustrating the configuration of electric wire segments for forming the stator coil.
Figure 7:
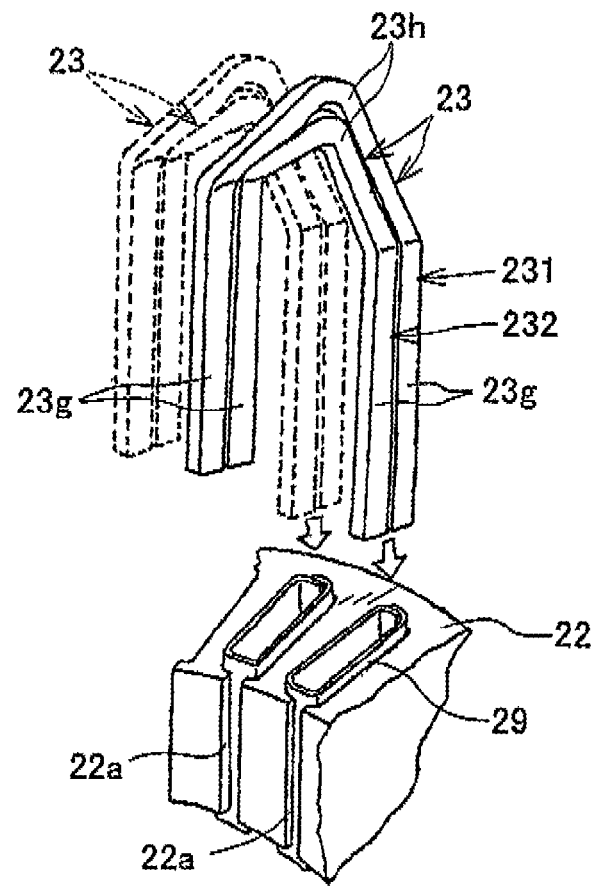
FIG. 7 is a schematic perspective view illustrating a process of inserting the electric wire segments into slots formed in a stator core of the stator.

Specifically, in the present embodiment, the stator coil 21 formed by mounting a plurality of substantially U-shaped electric wire segments 23 as shown in FIGS. 6 and 7 to the stator core 22 and then joining corresponding pairs of distal end parts 23f of the electric wire segments 23.

Each of the electric wire segments 23 is obtained by bending a straight electric wire segment into the substantially U shape; the straight electric wire segment has a substantially rectangular cross section perpendicular to its extending direction.

Figure 10:
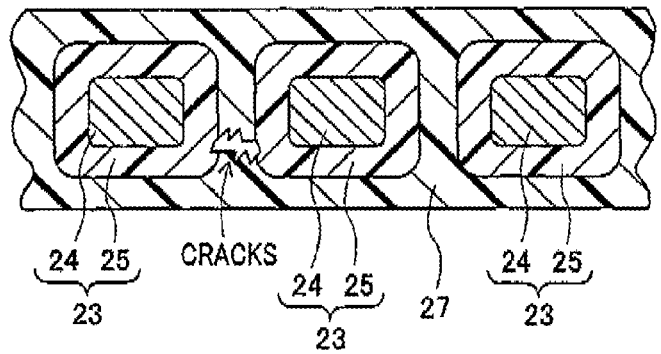
FIG. 10 is a schematic view illustrating the configuration of the electric wire segments according to the first embodiment and the varnish applied between the electric wire segments.
Figure 11:
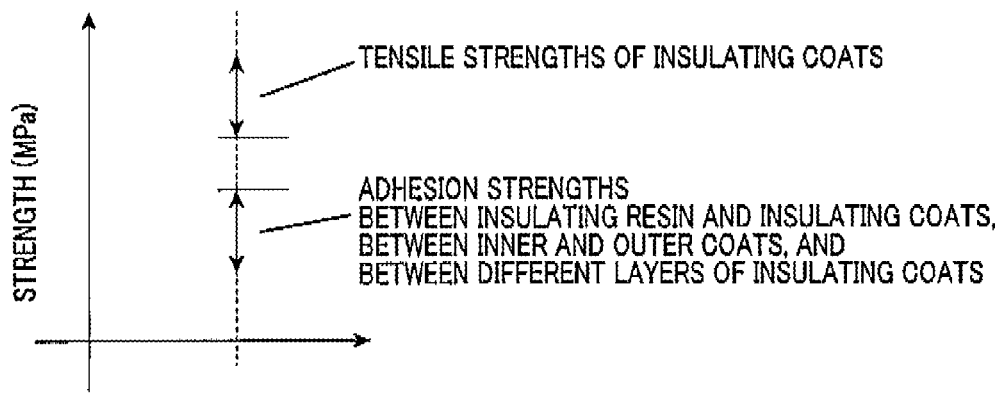
FIG. 11 is a graphical representation giving a comparison between the tensile strengths of insulating coats of the electric wire segments and the adhesion strength between the varnish and the insulating coats, the adhesion strength between inner and outer coats of the Insulating coats and the adhesion strength between different layers of the insulating coats according to the first to the eleventh embodiments.

Moreover, in the present embodiment, as shown in FIG. 10, each of the electric wire segments 23 is configured with an electric conductor 24 and an insulating coat 25 that covers the outer surface of the electric conductor 24. The electric conductor 24 is made, for example, of copper and has a substantially rectangular cross section perpendicular to its extending direction. The insulating coat 25 is removed from both the distal end parts 23f of the electric wire segment 23, thereby exposing the electric conductor 24 from the insulating coat 25 at the distal end parts 23f. Consequently, it is possible to join corresponding pairs of the distal end parts 23f of the electric wire segments 23 by welding.

In addition, in the present embodiment, the insulating coat 25 is formed, for example, of a polyimide (PI) and has a thickness in the range, for example, of 1 to 10 μm. More specifically, the insulating coat 25 is formed by: (1) dipping the electric conductor segment 25 in a polyimide melt contained in a bath for a predetermined time and then removing it from the bath; (2) passing the electric conductor segment 25 through a hole of a predetermined size so as to uniformize the thickness of the polyimide adhered on the outer surface of the electric conductor segment 25; and (3) baking the polyimide adhered on the outer surface of the electric conductor segment 25 in a bake oven for a predetermined time.

As shown in FIG. 7, before being mounted to the stator 8 core 22, each of the electric wire segments 23 has a pair of straight portions 23g extending parallel to each other and a turn portion 23h that connects ends of the straight portions 23g on the same side. In forming the stator coil 21, the straight portions 23g are axially inserted, from one axial side of the stator core 22, respectively into corresponding two of the slots 22a of the stator core 22; the corresponding two slots 22a are separated from each other by a predetermined pitch. Then, those parts of the straight portions 23g, which respectively protrude outside of the corresponding two slots 22a on the other axial side of the stator core 22, are bent so as to extend along the circumferential direction of the stator core 22 obliquely at a predetermined angle with respect to the axial end face of the stator core 22. Thereafter, corresponding pairs of the distal end parts 23f (see FIG. 6) of the electric wire segments 23 are joined by, for example, welding.

Consequently, in the resultant stator coil 21, each of the electric wire segments 23 has, as shown in FIG. 6, a pair of in-slot portions 23a, a first end portion 23b, and a pair of second end portions 23c. The in-slot portions 23a are respectively received in the corresponding two slots 22a of the stator core 22 and extend in the axial direction of the stator core 22. The first end portion 23b, which corresponds to the turn portion 23h before the mounting of the electric wire segment 23 to the stator core 22, connects the in-slot portions 23a on the one axial side (i.e., the rear side of the alternator 1 or the right side in FIG. 1) of the stator core 22. The second end portions 23c respectively extend from the in-slot portions 23a on the other axial side (i.e., the front side of the alternator 1 or the left side in FIG. 1) of the stator core 22.

Moreover, the first end portion 23b includes, at the tip thereof, a bent part 23d that is substantially V-shaped. On the other hand, each of the second end portions 23c is bent twice to include an oblique part 23e and a distal end part 23f. The oblique part 23e extends, along the circumferential direction of the stator core 22, obliquely at the predetermined angle with respect to the axial end face of the stator core 22 on the other axial side of the stator core 22. In addition, as described previously, from the distal end part 23f, the insulating coat 25 is removed to expose the electric conductor 24.

In each of the slots 22a of the stator core 22, there are received an even number of electric conductors (i.e., the in-slot portions 23a of the electric wire segments 23).

More specifically, in the present embodiment, as shown in FIG. 5, in each of the slots 22a of the stator core 22, there are received four electrical conductors that are aligned in the radial direction of the stator core 22. Hereinafter, the four electrical conductors are sequentially referred to as an innermost conductor, an inner-middle conductor, an outer-middle conductor, and an outermost conductor from the radially inside to the radially outside of the slot 22a. In addition, all of the four electric conductors received in the same slot 22a belong to the same phase of the stator coil 21.

Moreover, the electric conductors received in the slots 22a of the stator core 22 are electrically connected to one another in a predetermined pattern, forming the stator coil 21.

In the present embodiment, the electric conductors received in the slots 22a of the stator core 22 are made up of the in-slot portions 23a of the electric wire segments 23. On the one axial side of the stator core 22, the electric conductors received in the slots 22a of the stator core 22 are electrically connected to one another via the first end portions 23b of the electric wire segments 23. On the other axial side of the stator core 22, the electric conductors received in the slots 22a of the stator core 22 are electrically connected to one another by joining corresponding pairs of the distal end parts 23f of the electric wire segments 23. Referring again to FIG. 2, all the first end portions 23b of the electric wire segments 23 together make up a first coil end part of the stator coil 21 on the one axial side of the stator core 22. All the second end portions 23c of the electric wire segments 23 together make up a second coil end part of the stator coil 21 on the other axial side of the stator core 22.

Moreover, in the present embodiment, each electrically connected pair of the electric conductors are respectively received in a pair of the slots 22a of the stator core 22 which are separated from each other by a predetermined pitch.

Figure 9:
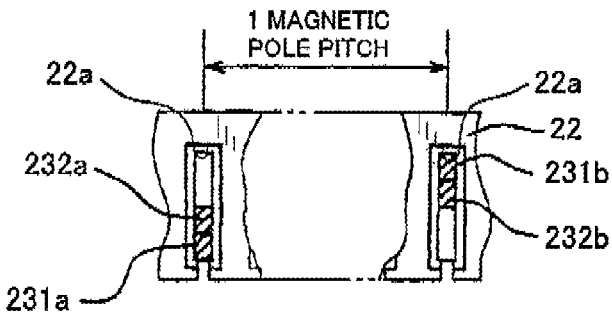
FIG. 9 is a schematic cross-sectional view illustrating the arrangement of the electric wire segments in the slots of the stator core.

For example, referring to FIGS. 6 and 9, for one of the slots 22a, the innermost conductor 231a in the slot 22a is electrically connected, via a connecting conductor 231c, to the outermost conductor 231b in another one of the slots 22a which is positioned away from the slot 22a by one magnetic pole pitch in the clockwise direction; the connecting conductor 231c is located on the one axial side of the stator core 22.

Similarly, for one of the slots 22a, the inner-middle conductor 232a in the slot 22a is connected, via a connecting conductor 232c, to the outer-middle conductor 232b in another one of the slots 22a which is positioned away from the slot 22a by one magnetic pole pitch in the clockwise direction; the connecting conductor 232c is also located on the one axial side of the stator core 22.

Consequently, on the one axial side of the stator core 22, each of the connecting conductors 232c that respectively connect pairs of the inner-middle conductors 232a and the outer-middle conductors 232b is circumscribed by a corresponding one of the connecting conductors 231c that respectively connect pairs of the innermost conductors 231a and the outermost conductors 231b. As a result, all the connecting conductors 232c together form an axially inner layer of the first coil end part of the stator coil 21; all the connecting conductors 231c together form an axially outer layer of the first coil end part of the stator coil 21.

Moreover, for one of the slots 22a, the inner-middle conductor 232a in the slot 22a is electrically connected, on the other axial side of the stator core 22, to the innermost conductor 231'a in another one of the slots 22a which is positioned away from the slot 22a by one magnetic pole pitch in the clockwise direction. More specifically, the inner-middle conductor 232a is electrically connected to the innermost conductor 231'a by joining a pair of connecting conductors 232d and 231d' that respectively extend from the inner-middle conductor 232a and the innermost conductor 231a'.

Similarly, for one of the slots 22a, the outermost conductor 231b' in the slot 22a is electrically connected, on the other axial side of the stator core 22, to the outer-middle conductor 232b in another one of the slots 22a which is positioned away from the slot 22a by one magnetic pole pitch in the clockwise direction. More specifically, the outermost conductor 231b' is electrically connected to the outer-middle conductor 232b by joining a pair of connecting conductors 231e' and 232e that respectively extend from the outermost conductor 231b' and the outer-middle conductor 232b.

Figure 8:
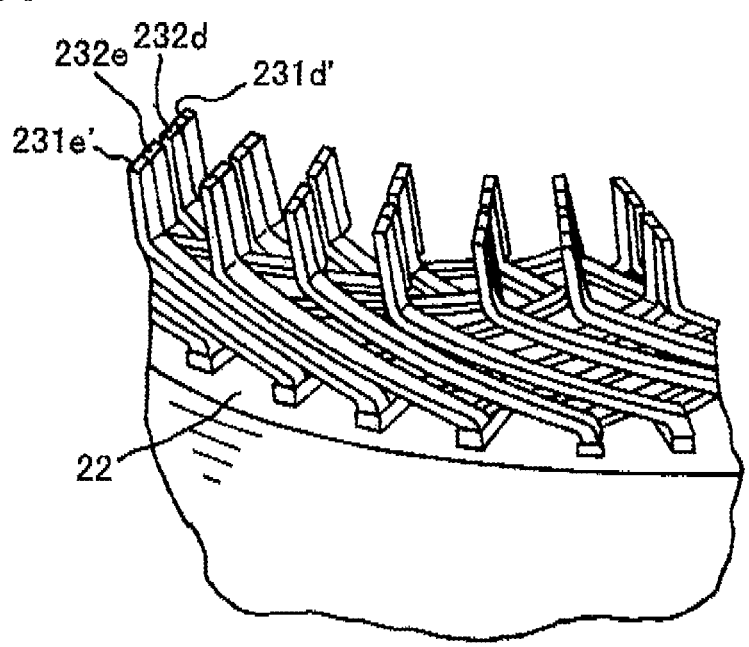
FIG. 8 is a perspective view showing part of the second coil end part of the stator coil.

Consequently, on the other axial side of the stator core 22, each of the joints between the connecting conductors 232d and the connecting conductors 231d' is positioned away from a corresponding one of the joints between the connecting conductor 231e' and the connecting conductors 232e both in the radial and circumferential directions of the stator core 22. As a result, as shown in FIG. 8, all the joints between the connecting conductors 232d and the connecting conductors 231d' fall on the same circle to form a radially inner layer of the second coil end part of the stator coil 21; all the joints between the connecting conductor 231e' and the connecting conductors 232e fall on the same circle to form a radially outer layer of the second coil end part of the stator coil 21.

Figure 3:
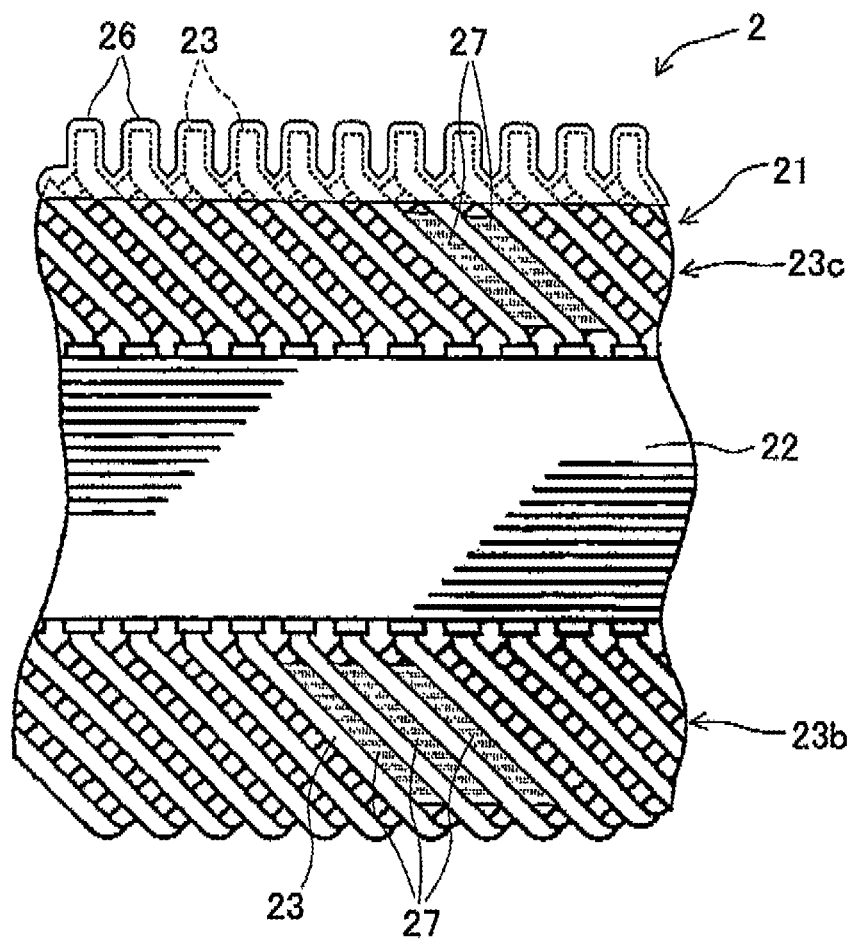
FIG. 3 is a side view of part of the stator.

In addition, to electrically insulate the joints between the connecting conductors 232d and the connecting conductors 231d' from the joints between the connecting conductor 231e' and the connecting conductors 232e, an insulating resin 26 is coated on all the joints, as shown in FIG. 3.

Moreover, In the present embodiment, as shown in FIGS. 6 and 7, the electric wire segments 23 are comprised of a plurality of pairs of large and small electric wire segments 231 and 232. Each connected set of the innermost conductor 231a, outermost conductor 231b, and connecting conductors 231c, 231d and 231e is formed in once piece construction by using one of the large electric wire segments 231. On the other hand, each connected set of the inner-middle conductor 232a, outer-middle conductor 232b, and connecting conductors 232c and 232d and 232e is formed in one piece construction by using one of the small electric wire segments 232.

In the present embodiment, the three-phase stator coil 21 is comprised of phase windings that are star-connected. Each of the phase windings is formed of a predetermined number of the electric wire segments 23 and extends around the stator core 22 by two turns. In addition, it should be noted that electric wire segments that are different in shape from the above-described electric wire segments 23 are also used for the formation of the stator coil 21. Those electric wire segments include, for example, electric wire segments for forming output and neutral terminals of the phase windings of the stator coil 21 and electric wire segments for connecting different turns of the same phase winding.

Figure 4:
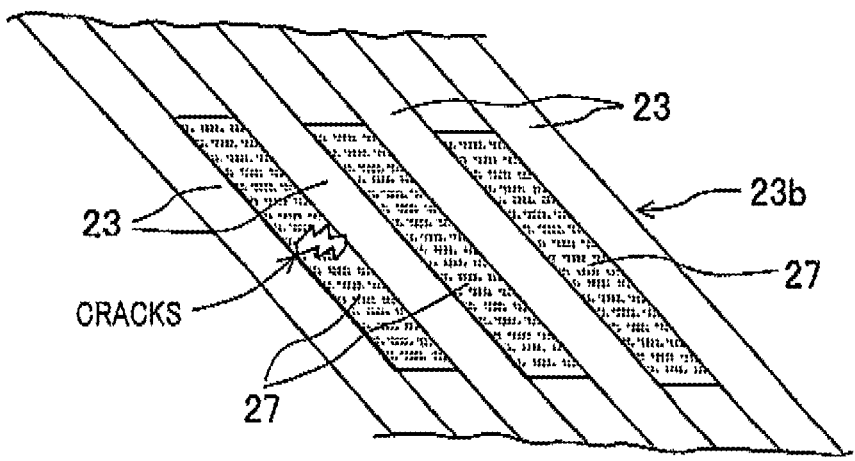
FIG. 4 is a schematic view illustrating occurrence of cracks in a varnish applied to first and second coil end parts of a stator coil of the stator.

Furthermore, in the present embodiment, as shown in FIGS. 3 and 4, to ensure resistance to vibration, a varnish 27 is applied as an insulating resin to both the first and second coil end parts of the stator coil 21 that is mounted on the stator core 22. The varnish 27 is implemented by, for example, an epoxy resin and applied so as to cover the insulating coats 25 formed at the outer surfaces of the first and second end portions 23b and 23c of the electric wire segments 23.

Further, in the present embodiment, the tensile strength of the Insulating coats 25 of the electric wire segments 23 is higher than the adhesion strength between the varnish 27 and the insulating coats 25. In other words, the adhesion strength between the varnish 27 and the insulating coats 25 is lower than the tensile strength of the insulating coats 25.

More specifically, in the present embodiment, the tensile strength of the insulating coats 25 of the electric wire segments 23 is in the range, for example, of 100 to 200 MPa, while the adhesion strength between the varnish 27 and the insulating coats 25 is in the range, for example, of 10 to 50 MPa.

The above-described alternator 1 according to the present embodiment has the following advantages.

In the present embodiment, the alternator 1 includes the rotor 3, the stator 2 and the varnish 27. The stator includes the stator core 22 and the stator coil 21 mounted on the stator core 22. The stator core 22 has the slots 22a formed therein. The stator coil 21 is partially received in the slots 22a of the stator core 22 so as to have the first and second coil end parts protruding outside of the slots 22a respectively on opposite axial sides of the stator core 22. The stator coil 21 is formed of the electric wire segments 23 that are connected to one other. Each of the electric wire segments 22a Includes the electric conductor 24 and the insulating coat 25 that covers the outer surface of the electric conductor 24. The varnish 27 is applied to both the first and second coil end parts of the stator coil 21 so as to cover the outer surfaces of the Insulating coats 25 of the electric wire segments 23 forming the stator coil 21. Further, the tensile strength of the insulating coats 25 of the electric wire segments 23 is higher than the adhesion strength between the varnish 27 and the insulating coats 25.

With the above configuration, when the ambient temperature of the stator 2 is changed with a change in operation of the alternator 1 and cracks are generated in the varnish 27 due to the change in the ambient temperature, the cracking stress will act in such a manner as to separate the varnish 27 from the insulating coats 25 of the electric wire segments 23. Consequently, the cracks generated in the varnish 27 are prevented from advancing to the insulating coats 25 of the electric wire segments 23. That is, the insulating coats 25 are prevented from being cracked along with the varnish 27; thus the cracks generated in the varnish 27 are prevented from reaching the electric conductors 24 of the electric wire segments 23. As a result, it is possible to reliably prevent a puncture or breakdown of the Insulating coats 25 from occurring.

Moreover, in the present embodiment, each of the electric wire segments 23 forming the stator coil 21 has the substantially rectangular cross-sectional shape.

With the substantially rectangular cross-sectional shape, when cracks are generated in the varnish 27, it is easy for the cracking stress to concentrate on the corner portions of the electric wire segments 23, thereby causing the insulating coats of the electric wire segments 23 to be cracked along with the varnish 27. However, in the present embodiment, as described above, the tensile strength of the Insulating coats 25 of the electric wire segments 23 is higher than the adhesion strength between the varnish 27 and the insulating coats 25. As a result, even with the substantially rectangular cross-sectional shape of the electric wire segments 23, it is still possible to prevent the insulating coats 25 from being cracked along with the varnish 27, thereby preventing a puncture of the Insulating coats 25 from occurring.

In the present embodiment, the stator coil 21 is mounted on the stator core 22 in a distributed winding manner.

With the distributed winding manner, the number of the slots 22a formed in the stator core 22 is relatively large; thus the number of spots where the varnish 27 is deposited is also relatively large. Accordingly, the possibility of cracks occurring in the varnish 27 is relatively high. However, in the present embodiment, as described above, the tensile strength of the insulating coats 25 of the electric wire segments 23 is higher than the adhesion strength between the varnish 27 and the insulating coats 25. As a result, even with the distributed winding manner, it is still possible to prevent the insulating coats 25 from being cracked along with the varnish 27, thereby preventing a puncture of the insulating coats 25 from occurring.

First Comparative Example

Figure 12:
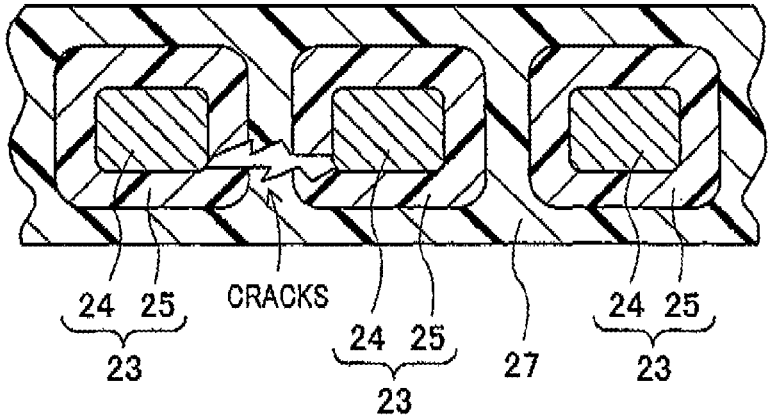
FIG. 12 is a schematic view illustrating the configuration of the electric wire segments according to a first comparative example and the varnish applied between the electric wire segments.

FIG. 12 illustrates the configuration of the electric wire segments 23 forming the stator coil 21 according to a first comparative example.

As shown in FIG. 12, in this comparative example, the electric wire segments 23 have the same configuration as those in the first embodiment except that the tensile strength of the insulating coats 25 of the electric wire segments 23 is lower than the adhesion strength between the varnish 27 and the insulating coats 25 unlike in the first embodiment.

Consequently, in this comparative example, when cracks are generated in the varnish 27 due to a change in the ambient temperature of the stator 2, the cracks will advance to the Insulating coats 25 of the electric wire segments 23 across the boundaries between the varnish 27 and the insulating coats 25, causing the Insulating coats 25 to be cracked along with the varnish 27. Further, in the worst case, the cracks may finally reach the electric conductors 24 of the electric wire segments 23, resulting in a puncture of the insulating coats 25.

[Second Embodiment]

This embodiment illustrates a rotating electric machine which has a similar configuration to the rotating electric machine (i.e., the automotive alternator 1) according to the first embodiment; accordingly, only the differences therebetween will be described hereinafter.

Figure 13:
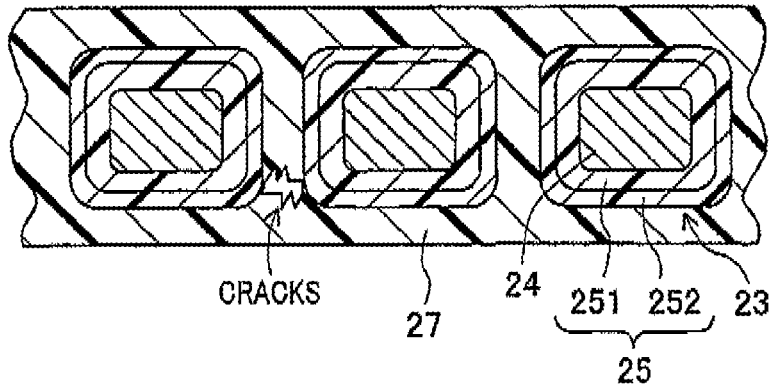
FIG. 13 is a schematic view illustrating the configuration of the electric wire segments according to the second embodiment and the varnish applied between the electric wire segments.

As shown in FIG. 13, in the present embodiment, each of the electric wire segments 23 forming the stator coil 21 is configured with an electric conductor 24 and an Insulating coat 25 that covers the outer surface of the electric conductor 24. The electric conductor 24 is made, for example, of copper and has a substantially rectangular cross section perpendicular to its extending direction. The Insulating coat 25 is two-layer structured to include an inner layer 251 and an outer layer 252 that is formed outside of the inner layer 251. Each of the Inner and outer layers 251 and 252 of the insulating coat 25 is formed, for example, of a polyimide (PI) and has a thickness in the range, for example, of 1 to 10 μm.

Moreover, in the present embodiment, each of the Inner and outer layers 251 and 252 of the insulating coats 25 is formed in the same way as the Insulating coats 25 in the first embodiment. Further, since the inner and outer layers 251 and 252 are formed of the same insulating material, they can be baked in the same bake oven. In addition, the adhesion strength between the inner and outer layers 251 and 252 can be easily controlled by adjusting the baking times and baking temperatures of those layers 251 and 252.

Furthermore, in the present embodiment, the tensile strength of the insulating coats 25 of the electric wire segments 23 is higher than the adhesion strength between the varnish 27 and the insulating coats 25, as in the first embodiment.

Consequently, the rotating electric machine according to the present embodiment has the same advantages as that according to the first embodiment. More specifically, when cracks are generated in the varnish 27 due to a change in the ambient temperature of the stator 2, the insulating coats 25 of the electric conductor segments 23 are prevented from being cracked along with the varnish 27. As a result, it is possible to reliably prevent a puncture or breakdown of the insulating coats 25 from occurring.

Second Comparative Example

Figure 14:
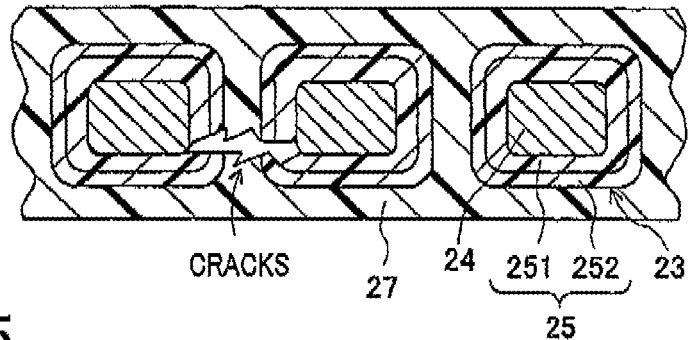
FIG. 14 is a schematic view illustrating the configuration of the electric wire segments according to a second comparative example and the varnish applied between the electric wire segments.

FIG. 14 illustrates the configuration of the electric wire segments 23 forming the stator coil 21 according to a second comparative example.

As shown in FIG. 14, in this comparative example, the electric wire segments 23 have the same configuration as those in the second embodiment except that the tensile strength of the insulating coats 25 of the electric wire segments 23 is lower than the adhesion strength between the varnish 27 and the insulating coats 25 unlike in the second embodiment.

Consequently, in this comparative example, when cracks are generated in the varnish 27 due to a change in the ambient temperature of the stator 2, the cracks will advance to the insulating coats 25 of the electric wire segments 23 across the boundaries between the varnish 27 and the insulating coats 25, causing the Insulating coats 25 to be cracked along with the varnish 27. Further, in the worst case, the cracks may finally reach the electric conductors 24 of the electric wire segments 23, resulting in a puncture of the Insulating coats 25.

[Third Embodiment]

This embodiment illustrates a rotating electric machine which has a similar configuration to the rotating electric machine according to the first embodiment; accordingly, only the differences therebetween will be described hereinafter.

Figure 15:
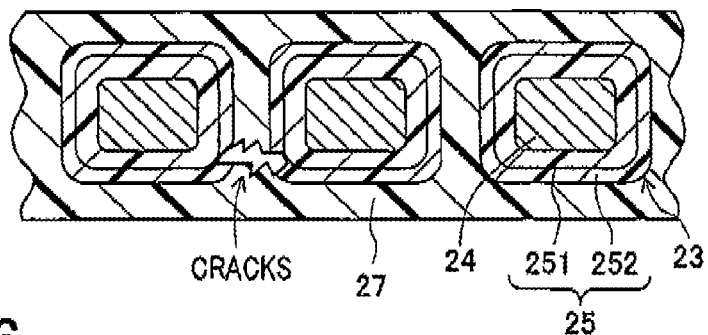
FIG. 15 is a schematic view illustrating the configuration of the electric wire segments according to the third embodiment and the varnish applied between the electric wire segments.

As shown in FIG. 15, in the present embodiment, each of the electric wire segments 23 forming the stator coil 21 is configured with an electric conductor 24 and an insulating coat 25 that covers the outer surface of the electric conductor 24. The electric conductor 24 is made, for example, of copper and has a substantially rectangular cross section perpendicular to its extending direction. The insulating coat 25 is two-layer structured to include an inner layer 251 and an outer layer 252 that is formed outside of the inner layer 251. Each of the Inner and outer layers 251 and 252 of the insulating coat 25 is formed, for example, of a polyimide (PI) and has a thickness in the range, for example, of 1 to 10 μm.

Moreover, in the present embodiment, each of the inner and outer layers 251 and 252 of the insulating coats 25 is formed in the same way as the Insulating coats 25 in the first embodiment. Further, since the inner and outer layers 251 and 252 are formed of the same insulating material, they can be baked in the same bake oven. In addition, the adhesion strength between the inner and outer layers 251 and 252 can be easily set to a desired value by adjusting the baking times and baking temperatures of those layers 251 and 252.

Furthermore, in the present embodiment, the tensile strength of the insulating coats 25 of the electric wire segments 23 is higher than the adhesion strength between the inner and outer layers 251 and 252 of the insulating coats 25.

Consequently, even if cracks generated in the varnish 27 reach the boundaries between the Inner and outer layers 251 and 252 of the Insulating coats 25, it is possible to prevent the cracks from further advancing to the inner layers 251 across the boundaries. Thus, the cracks are also prevented from reaching the electric conductors 24 of the electric wire segments 23. As a result, it is possible to reliably prevent a puncture of the Insulating coats 25 from occurring.

Third Comparative Example

Figure 16:
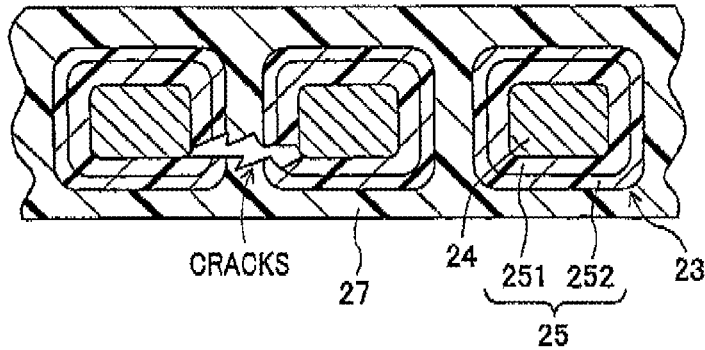
FIG. 16 is a schematic view illustrating the configuration of the electric wire segments according to a third comparative example and the varnish applied between the electric wire segments.

FIG. 16 illustrates the configuration of the electric wire segments 23 forming the stator coil 21 according to a third comparative example.

As shown in FIG. 16, in this comparative example, the electric wire segments 23 have the same configuration as those in the third embodiment except that the tensile strength of the insulating coats 25 of the electric wire segments 23 is lower than the adhesion strength between the inner and outer layers 251 and 252 of the Insulating coats 25 unlike in the third embodiment.

Consequently, in this comparative example, when cracks generated in the varnish 27 reach the boundaries between the inner and outer layers 251 and 252 of the Insulating coats 25, the cracks will further advance to the inner layers 251 across the boundaries. Thus, in the worst case, the cracks may finally reach the electric conductors 24 of the electric wire segments 23, resulting in a puncture of the insulating coats 25.

[Fourth Embodiment]

This embodiment illustrates a rotating electric machine which has a similar configuration to the rotating electric machine according to the first embodiment; accordingly, only the differences therebetween will be described hereinafter.

Figure 17:
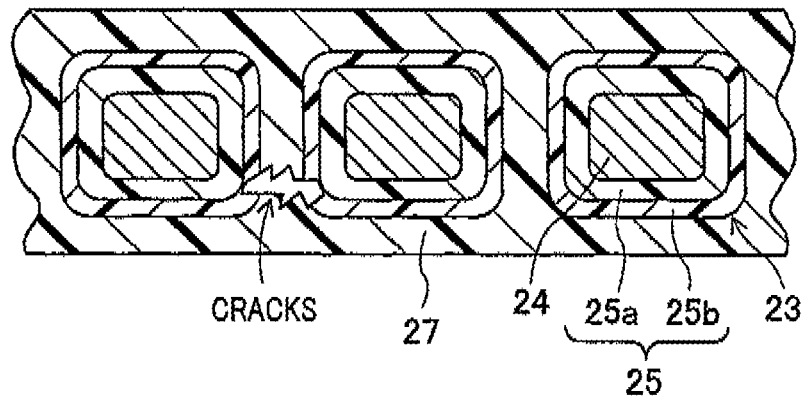
FIG. 17 is a schematic view illustrating the configuration of the electric wire segments according to the fourth embodiment and the varnish applied between the electric wire segments.

As shown in FIG. 17, in the present embodiment, each of the electric wire segments 23 forming the stator coil 21 is configured with an electric conductor 24 and an insulating coat 25 that covers the outer surface of the electric conductor 24. The electric conductor 24 is made, for example, of copper and has a substantially rectangular cross section perpendicular to its extending direction. The insulating coat 25 consists of an Inner coat 25a and an outer coat 25b that is formed outside of the inner coat 25a. Each of the inner and outer coats 25a and 25b has a thickness in the range, for example, of 1 to 10 μm. The inner and outer coats 25a and 25b are formed of different insulating materials. More specifically, the inner coat 25a is formed, for example, of a polyamide-imide (AI), while the outer coat 25b is formed, for example, of a polyImide (PI).

Moreover, in the present embodiment, each of the inner and outer coats 25a and 25b is formed in the same way as the Insulating coats 25 in the first embodiment. In addition, the adhesion strength between the inner and outer coats 25a and 25b can be easily set to a desired value by adjusting the baking times and baking temperatures of those layers 25a and 25b.

In the present embodiment, the tensile strength of the inner coats 25a of the electric wire segments 23 is higher than the adhesion strength between the inner and outer coats 25a and 25b of the electric wire segments 23.

Consequently, even if cracks generated in the varnish 27 reach the boundaries between the inner and outer coats 25a and 25b of the electric wire segments 23, it is possible to prevent the cracks from further advancing to the inner coats 25a across the boundaries. Thus, the cracks are also prevented from reaching the electric conductors 24 of the electric wire segments 23. As a result, it is possible to reliably prevent a puncture of the insulating coats 25 of the electric wire segments 23 from occurring.

Fourth Comparative Example

Figure 18:
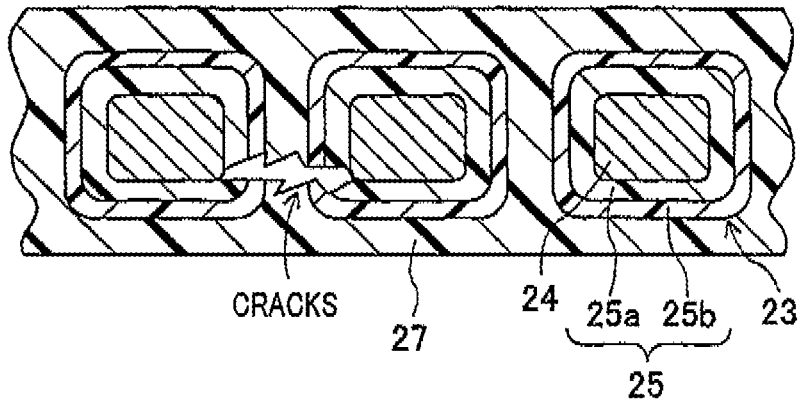
FIG. 18 is a schematic view illustrating the configuration of the electric wire segments according to a fourth comparative example and the varnish applied between the electric wire segments.

FIG. 18 illustrates the configuration of the electric wire segments 23 forming the stator coil 21 according to a fourth comparative example.

As shown in FIG. 18, in this comparative example, the electric wire segments 23 have the same configuration as those in the fourth embodiment except that the tensile strength of the Inner coats 25a of the electric wire segments 23 is lower than the adhesion strength between the inner and outer coats 25a and 25b of the electric wire segments 23 unlike in the fourth embodiment.

Consequently, in this comparative example, when cracks generated in the varnish 27 reach the boundaries between the inner and outer coats 25a and 25b of the electric wire segments 23, the cracks will further advance to the inner coats 25a across the boundaries. Thus, in the worst case, the cracks may finally reach the electric conductors 24 of the electric wire segments 23, resulting in a puncture of the insulating coats 25.

[Fifth Embodiment]

This embodiment illustrates a rotating electric machine which has a similar configuration to the rotating electric machine according to the first embodiment; accordingly, only the differences therebetween will be described hereinafter.

Figure 19:
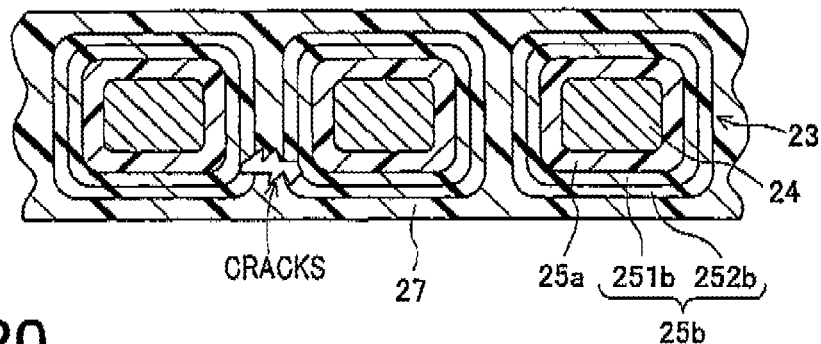
FIG. 19 is a schematic view illustrating the configuration of the electric wire segments according to the fifth embodiment and the varnish applied between the electric wire segments.

As shown in FIG. 19, in the present embodiment, each of the electric wire segments 23 forming the stator coil 21 is configured with an electric conductor 24 and an insulating coat 25 that covers the outer surface of the electric conductor 24. The electric conductor 24 is made, for example, of copper and has a substantially rectangular cross section perpendicular to its extending direction. The Insulating coat 25 consists of an inner coat 25a and an outer coat 25b that is formed outside of the inner coat 25a. The inner coat 25a is single-layer structured, while the outer coat 25b is two-layer structured to include an inner layer 251b and an outer layer 252b.

The inner coat 25a has a thickness in the range, for example, of 1 to 10 µm. Each of the inner and outer layers 251b and 252b of the outer coat 25b also has a thickness in the range, for example, of 1 to 10 µm.

The inner and outer coats 25a and 25b are formed of different insulating materials, while the inner and outer layers 251b and 252b of the outer coat 25b are formed of the same insulating material. More specifically, the inner coat 25a is formed, for example, of a polyamide-imide (AI), while both the inner and outer layers 251b and 252b of the outer coat 25b are formed, for example, of a polyimide (PI).

Moreover, in the present embodiment, the inner coat 25a and the inner and outer layers 251b and 252b of the outer coat 25b are formed in the same way as the insulating coats 25 in the first embodiment. In addition, the adhesion strength between the inner and outer coats 25a and 25b and the adhesion strength between the inner and outer layers 251b and 252b of the outer coat 25b can be easily set to respective desired values by adjusting the baking times and baking temperatures of the inner coat 25a and the inner and outer layers 251b and 252b of the outer coat 25b.

In the present embodiment, the tensile strength of the outer coats 25b of the electric wire segments 23 is higher than the adhesion strength between the inner and outer layers 251b and 252b of the outer coats 25b.

Consequently, even if cracks generated in the varnish 27 reach the boundaries between the Inner and outer layers 251b and 252b of the outer coats 25b, it is possible to prevent the cracks from further advancing to the inner layers 251b across the boundaries. Thus, the cracks are also prevented from reaching the electric conductors 24 of the electric wire segments 23. As a result, it is possible to reliably prevent a puncture of the Insulating coats 25 of the electric wire segments 23 from occurring.

In addition, in cases where each of the insulating coats 25 of the electric wire segments 23 includes a plurality of layers (or coats), as in the present embodiment, the adhesion strengths between the layers may be different from each other. In those cases, it is preferable to arrange, In each of the insulating coats 25, the plurality of layers in such a manner that the adhesion strengths between the layers decrease from the Inside to the outside of the insulating coat 25. As a result, it is possible to stop advancement of cracks generated in the varnish 27 at the outermost layers of the Insulating coats 25.

Fifth Comparative Example

Figure 20:
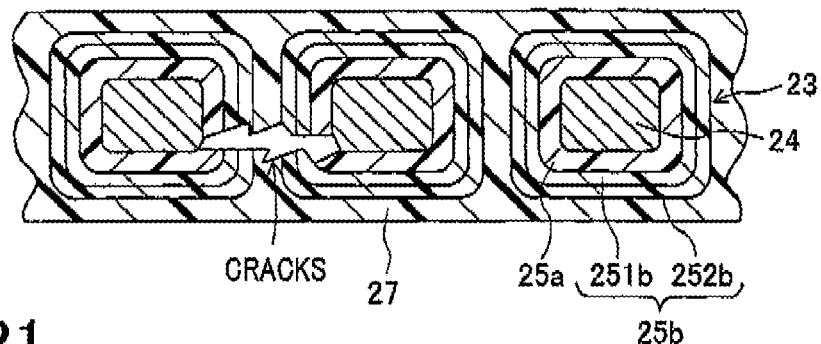
FIG. 20 is a schematic view illustrating the configuration of the electric wire segments according to a fifth comparative example and the varnish applied between the electric wire segments.

FIG. 20 illustrates the configuration of the electric wire segments 23 forming the stator coil 21 according to a fifth comparative example.

As shown in FIG. 20, in this comparative example, the electric wire segments 23 have the same configuration as those in the fifth embodiment except that the tensile strength of the outer coats 25b of the electric wire segments 23 is lower than the adhesion strength between the Inner and outer layers 251b and 252b of the outer coats 25b unlike in the fifth embodiment.

Consequently, in this comparative example, when cracks generated in the varnish 27 reach the boundaries between the inner and outer layers 251b and 252b of the outer coats 25b, the cracks will further advance to the inner layers 251b across the boundaries. Thus, in the worst case, the cracks may finally reach the electric conductors 24 of the electric wire segments 23, resulting in a puncture of the Insulating coats 25.

[Sixth Embodiment]

This embodiment illustrates a rotating electric machine which has a similar configuration to the rotating electric machine according to the first embodiment; accordingly, only the differences therebetween will be described hereinafter.

Figure 21:
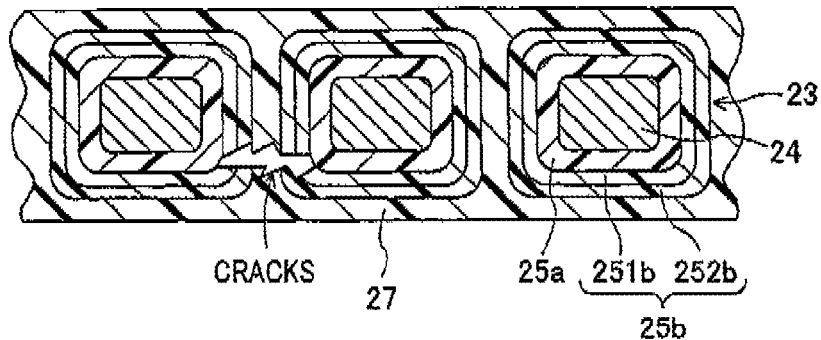
FIG. 21 is a schematic view illustrating the configuration of the electric wire segments according to the sixth embodiment and the varnish applied between the electric wire segments.

As shown in FIG. 21, in the present embodiment, each of the electric wire segments 23 forming the stator coil 21 is configured with an electric conductor 24 and an insulating coat 25 that covers the outer surface of the electric conductor 24. The electric conductor 24 is made, for example, of copper and has a substantially rectangular cross section perpendicular to its extending direction. The insulating coat 25 consists of an inner coat 25a and an outer coat 25b that is formed outside of the inner coat 25a. The inner coat 25a is single-layer structured, while the outer coat 25b is two-layer structured to include an inner layer 251b and an outer layer 252b.

The inner coat 25a has a thickness in the range, for example, of 1 to 10 µm. Each of the inner and outer layers 251b and 252b of the outer coat 25b also has a thickness in the range, for example, of 1 to 10 µm.

The inner and outer coats 25a and 25b are formed of different insulating materials, while the Inner and outer layers 251b and 252b of the outer coat 25b are formed of the same insulating material. More specifically, the inner coat 25a is formed, for example, of a polyimide (PI), while both the inner and outer layers 251b and 252b of the outer coat 25b are formed, for example, of a polyamide-imide (AI).

Moreover, in the present embodiment, the inner coat 25a and the inner and outer layers 251b and 252b of the outer coat 25b are formed in the same way as the insulating coats 25 in the first embodiment. In addition, the adhesion strength between the Inner and outer coats 25a and 25b and the adhesion strength between the Inner and outer layers 251b and 252b of the outer coat 25b can be easily set to respective desired values by adjusting the baking times and baking temperatures of the inner coat 25a and the inner and outer layers 251b and 252b of the outer coat 25b.

In the present embodiment, the tensile strength of the inner coats 25a of the electric wire segments 23 is higher than the adhesion strength between the inner coats 25a and the inner layers 251b of the outer coats 25b of the electric wire segments 23.

Consequently, even if cracks generated in the varnish 27 reach the boundaries between the inner coats 25a and the inner layers 251b of the outer coats 25b, it is possible to prevent the cracks from further advancing to the inner coats 25a across the boundaries. Thus, the cracks are also prevented from reaching the electric conductors 24 of the electric wire segments 23. As a result, it is possible to reliably prevent a puncture of the insulating coats 25 of the electric wire segments 23 from occurring.

Sixth Comparative Example

Figure 22:
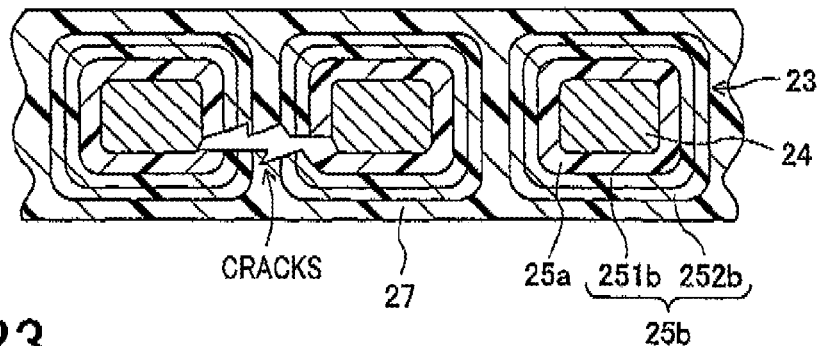
FIG. 22 is a schematic view illustrating the configuration of the electric wire segments according to a sixth comparative example and the varnish applied between the electric wire segments.

FIG. 22 illustrates the configuration of the electric wire segments 23 forming the stator coil 21 according to a sixth comparative example.

As shown in FIG. 22, in this comparative example, the electric wire segments 23 have the same configuration as those in the sixth embodiment except that the tensile strength of the inner coats 25a of the electric wire segments 23 is lower than the adhesion strength between the inner coats 25a and the inner layers 251b of the outer coats 25b unlike in the sixth embodiment.

Consequently, in this comparative example, when cracks generated in the varnish 27 reach the boundaries between the inner coats 25a and the inner layers 251b of the outer coats 25b, the cracks will further advance to the Inner coats 25a across the boundaries. Thus, in the worst case, the cracks may finally reach the electric conductors 24 of the electric wire segments 23, resulting in a puncture of the insulating coats 25.

[Seventh Embodiment]

This embodiment illustrates a rotating electric machine which has a similar configuration to the rotating electric machine according to the first embodiment; accordingly, only the differences therebetween will be described hereinafter.

Figure 23:
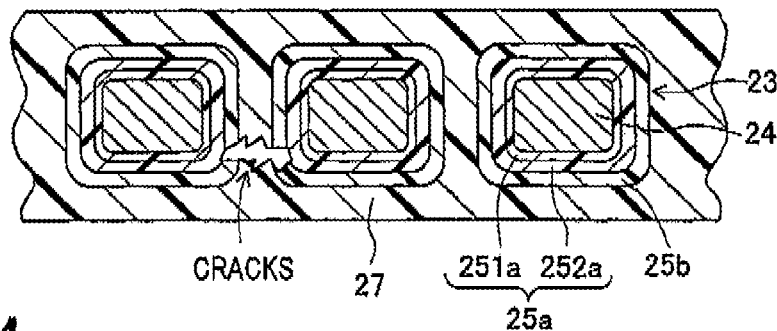
FIG. 23 is a schematic view illustrating the configuration of the electric wire segments according to the seventh embodiment and the varnish applied between the electric wire segments.

As shown in FIG. 23, in the present embodiment, each of the electric wire segments 23 forming the stator coil 21 is configured with an electric conductor 24 and an insulating coat 25 that covers the outer surface of the electric conductor 24. The electric conductor 24 is made, for example, of copper and has a substantially rectangular cross section perpendicular to its extending direction. The insulating coat 25 consists of an inner coat 25a and an outer coat 25b that is formed outside of the inner coat 25a. The Inner coat 25a is two-layer structured to include an inner layer 251a and an outer layer 252a, while the outer coat 25b is single-layer structured.

Each of the inner and outer layers 251a and 252a of the inner coat 25a has a thickness in the range, for example, of 1 to 10 µm. The outer coat 25b also has a thickness in the range, for example, of 1 to 10 µm.

The inner and outer coats 25a and 25b are formed of different insulating materials, while the inner and outer layers 251a and 252a of the inner coat 25a are formed of the same insulating material. More specifically, both the inner and outer layers 251a and 252a of the inner coat 25a are formed, for example, of a polyimide (PI), while the outer coat 25b is formed, for example, of a polyamide-imide (AI).

Moreover, in the present embodiment, the inner and outer layers 251a and 252a of the inner coat 25a and the outer coat 25b are formed in the same way as the Insulating coats 25 in the first embodiment. In addition, the adhesion strength between the inner and outer coats 25a and 25b and the adhesion strength between the inner and outer layers 251a and 252a of the inner coat 25a can be easily set to respective desired values by adjusting the baking times and baking temperatures of the inner and outer layers 251a and 252a of the inner coat 25a and the outer coat 25b.

In the present embodiment, the tensile strength of the Inner coats 25a of the electric wire segments 23 is higher than the adhesion strength between the outer layers 252a of the inner coats 25a and the outer coats 25b of the electric wire segments 23.

Consequently, even if cracks generated in the varnish 27 reach the boundaries between the outer layers 252a of the inner coats 25a and the outer coats 25b, it is possible to prevent the cracks from further advancing to the outer layers 252a of the inner coats 25a across the boundaries. Thus, the cracks are also prevented from reaching the electric conductors 24 of the electric wire segments 23. As a result, it is possible to reliably prevent a puncture of the Insulating coats 25 of the electric wire segments 23 from occurring.

Seventh Comparative Example

Figure 24:
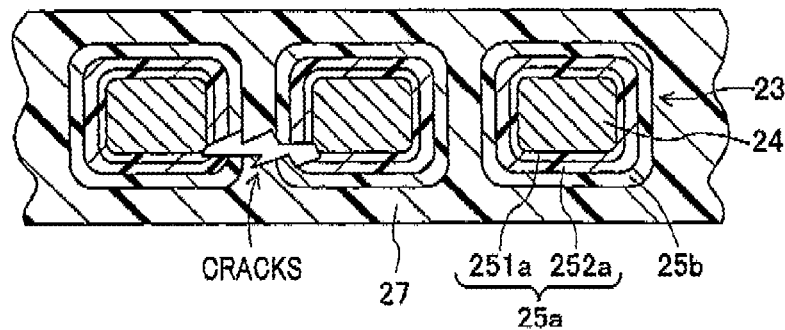
FIG. 24 is a schematic view illustrating the configuration of the electric wire segments according to a seventh comparative example and the varnish applied between the electric wire segments.

FIG. 24 illustrates the configuration of the electric wire segments 23 forming the stator coil 21 according to a seventh comparative example.

As shown in FIG. 24, in this comparative example, the electric wire segments 23 have the same configuration as those in the seventh embodiment except that the tensile strength of the Inner coats 25a of the electric wire segments 23 is lower than the adhesion strength between the outer layers 252a of the inner coats 25a and the outer coats 25b unlike in the seventh embodiment.

Consequently, in this comparative example, when cracks generated in the varnish 27 reach the boundaries between the outer layers 252a of the inner coats 25a and the outer coats 25b, the cracks will further advance to the outer layers 252a of the inner coats 25a across the boundaries. Thus, in the worst case, the cracks may finally reach the electric conductors 24 of the electric wire segments 23, resulting in a puncture of the Insulating coats 25.

[Eighth Embodiment]

This embodiment illustrates a rotating electric machine which has a similar configuration to the rotating electric machine according to the first embodiment; accordingly, only the differences therebetween will be described hereinafter.

Figure 25:
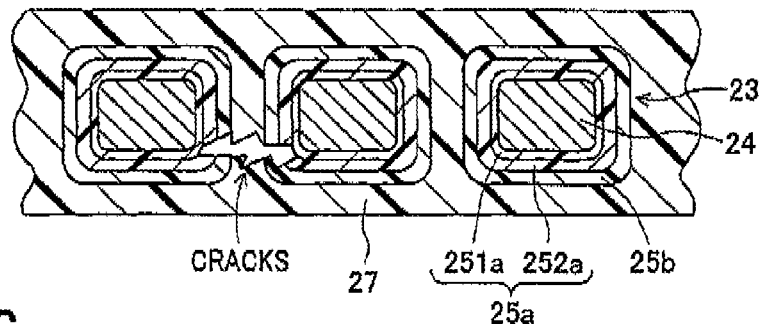
FIG. 25 is a schematic view illustrating the configuration of the electric wire segments according to the eighth embodiment and the varnish applied between the electric wire segments.

As shown in FIG. 25, in the present embodiment, each of the electric wire segments 23 forming the stator coil 21 is configured with an electric conductor 24 and an insulating coat 25 that covers the outer surface of the electric conductor 24. The electric conductor 24 is made, for example, of copper and has a substantially rectangular cross section perpendicular to its extending direction. The insulating coat 25 consists of an inner coat 25a and an outer coat 25b that is formed outside of the inner coat 25a. The inner coat 25a is two-layer structured to include an inner layer 251a and an outer layer 252a, while the outer coat 25b is single-layer structured.

Each of the inner and outer layers 251a and 252a of the inner coat 25a has a thickness in the range, for example, of 1 to 10 µm. The outer coat 25b also has a thickness in the range, for example, of 1 to 10 µm.

The inner and outer coats 25a and 25b are formed of different insulating materials, while the Inner and outer layers 251a and 252a of the inner coat 25a are formed of the same insulating material. More specifically, both the inner and outer layers 251a and 252a of the inner coat 25a are formed, for example, of a polyimide (PI), while the outer coat 25b is formed, for example, of a polyamide-imide (AI).

Moreover, in the present embodiment, the inner and outer layers 251a and 252a of the Inner coat 25a and the outer coat 25b are formed in the same way as the insulating coats 25 in the first embodiment. In addition, the adhesion strength between the inner and outer coats 25a and 25b and the adhesion strength between the inner and outer layers 251a and 252a of the inner coat 25a can be easily set to respective desired values by adjusting the baking times and baking temperatures of the Inner and outer layers 251a and 252a of the inner coat 25a and the outer coat 25b.

In the present embodiment, the tensile strength of the inner coats 25a of the electric wire segments 23 is higher than the adhesion strength between the inner and outer layers 251a and 252a of the inner coats 25a.

Consequently, even if cracks generated in the varnish 27 reach the boundaries between the inner and outer layers 251a and 252a of the inner coats 25a, it is possible to prevent the cracks from further advancing to the inner layers 251a of the inner coats 25a across the boundaries. Thus, the cracks are also prevented from reaching the electric conductors 24 of the electric wire segments 23. As a result, it is possible to reliably prevent a puncture of the insulating coats 25 of the electric wire segments 23 from occurring.

Eighth Comparative Example

Figure 26:
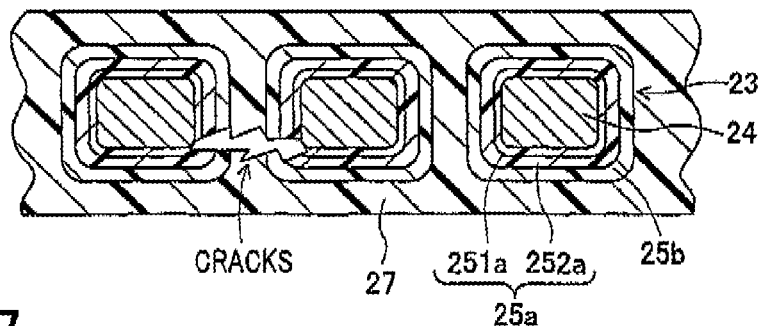
FIG. 26 is a schematic view illustrating the configuration of the electric wire segments according to an eighth comparative example and the varnish applied between the electric wire segments.

FIG. 26 illustrates the configuration of the electric wire segments 23 forming the stator coil 21 according to an eighth comparative example.

As shown in FIG. 26, in this comparative example, the electric wire segments 23 have the same configuration as those in the eighth embodiment except that the tensile strength of the inner coats 25a of the electric wire segments 23 is lower than the adhesion strength between the inner and outer layers 251a and 252a of the inner coats 25a unlike in the eighth embodiment.

Consequently, in this comparative example, when cracks generated in the varnish 27 reach the boundaries between the inner and outer layers 251a and 252a of the Inner coats 25a, the cracks will further advance to the inner layers 251a of the inner coats 25a across the boundaries. Thus, in the worst case, the cracks may finally reach the electric conductors 24 of the electric wire segments 23, resulting in a puncture of the insulating coats 25.

[Ninth Embodiment]

This embodiment illustrates a rotating electric machine which has a similar configuration to the rotating electric machine according to the first embodiment; accordingly, only the differences therebetween will be described hereinafter.

Figure 27:
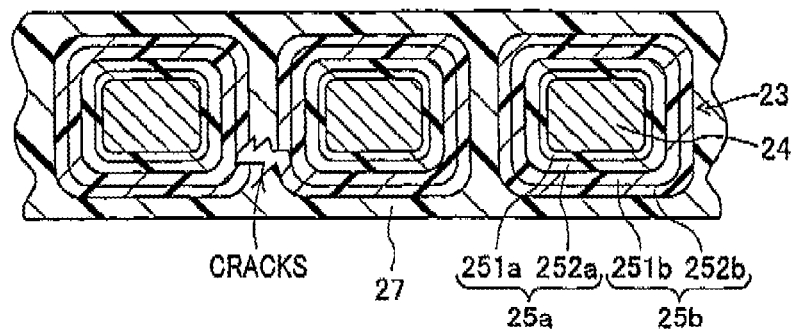
FIG. 27 is a schematic view illustrating the configuration of the electric wire segments according to the ninth embodiment and the varnish applied between the electric wire segments.

As shown in FIG. 27, in the present embodiment, each of the electric wire segments 23 forming the stator coil 21 is configured with an electric conductor 24 and an insulating coat 25 that covers the outer surface of the electric conductor 24. The electric conductor 24 is made, for example, of copper and has a substantially rectangular cross section perpendicular to its extending direction. The insulating coat 25 consists of an inner coat 25a and an outer coat 25b that is formed outside of the inner coat 25a. The inner coat 25a is two-layer structured to include an inner layer 251a and an outer layer 252a, while the outer coat 25b is two-layer structured to include an inner layer 251b and an outer layer 252b.

Each of the inner and outer layers 251a and 252a of the Inner coat 25a has a thickness in the range, for example, of 1 to 10 μm. Each of the inner and outer layers 251b and 252b of the outer coat 25b also has a thickness in the range, for example, of 1 to 10 μm.

The inner and outer coats 25a and 25b are formed of different insulating materials, while the inner and outer layers 251a and 252a of the inner coat 25a are formed of the same insulating material and the inner and outer layers 251b and 252b of the outer coat 25b are formed of the same insulating material. More specifically, both the inner and outer layers 251a and 252a of the Inner coat 25 are formed, for example, of a polyamide-imide (AI), while both the Inner and outer layers 251b and 252b of the outer coat 25b are formed, for example, of a polyimide (PI).

Moreover, in the present embodiment, the Inner and outer layers 251a and 252a of the inner coat 25a and the inner and outer layers 251b and 252b of the outer coat 25b are formed in the same way as the insulating coats 25 in the first embodiment. In addition, the adhesion strength between the inner and outer layers 251a and 252a of the inner coat 25, the adhesion strength between the inner and outer coats 25a and 25b, and the adhesion strength between the inner and outer layers 251b and 252b of the outer coat 25b can be easily set to respective desired values by adjusting the baking times and baking temperatures of the inner and outer layers 251a and 252a of the inner coat 25a and the inner and outer layers 251b and 252b of the outer coat 25b.

In the present embodiment, the tensile strength of the outer coats 25b of the electric wire segments 23 is higher than the adhesion strength between the inner and outer layers 251b and 252b of the outer coats 25b.

Consequently, even if cracks generated in the varnish 27 reach the boundaries between the inner and outer layers 251b and 252b of the outer coats 25b, it is possible to prevent the cracks from further advancing to the inner layers 251b across the boundaries. Thus, the cracks are also prevented from reaching the electric conductors 24 of the electric wire segments 23. As a result, it is possible to reliably prevent a puncture of the insulating coats 25 of the electric wire segments 23 from occurring.

Ninth Comparative Example

Figure 28:
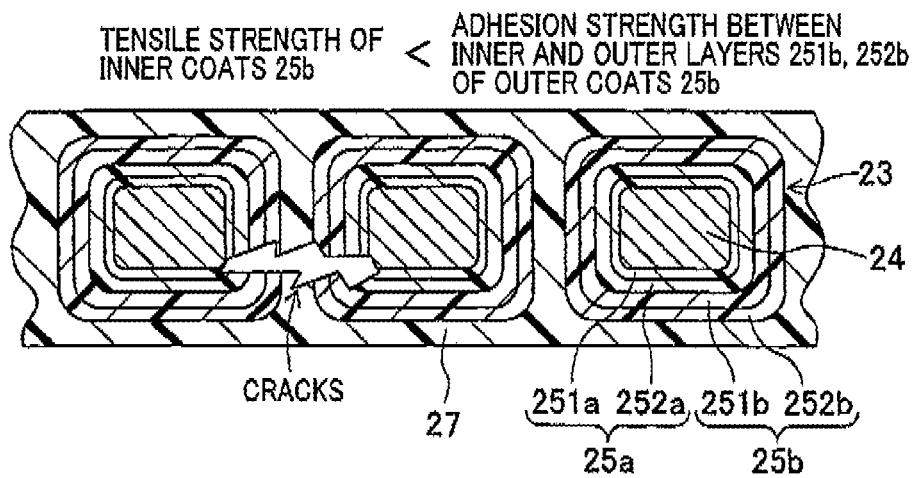
FIG. 28 is a schematic view illustrating the configuration of the electric wire segments according to a ninth comparative example and the varnish applied between the electric wire segments.

FIG. 28 illustrates the configuration of the electric wire segments 23 forming the stator coil 21 according to a ninth comparative example.

As shown in FIG. 28, in this comparative example, the electric wire segments 23 have the same configuration as those in the ninth embodiment except that the tensile strength of the outer coats 25b of the electric wire segments 23 is lower than the adhesion strength between the inner and outer layers 251b and 252b of the outer coats 25b unlike in the ninth embodiment.

Consequently, in this comparative example, when cracks generated in the varnish 27 reach the boundaries between the inner and outer layers 251b and 252b of the outer coats 25b, the cracks will further advance to the inner layers 251b across the boundaries. Thus, in the worst case, the cracks may finally reach the electric conductors 24 of the electric wire segments 23, resulting in a puncture of the Insulating coats 25.

[Tenth Embodiment]

This embodiment illustrates a rotating electric machine which has a similar configuration to the rotating electric machine according to the first embodiment; accordingly, only the differences therebetween will be described hereinafter.

Figure 29:
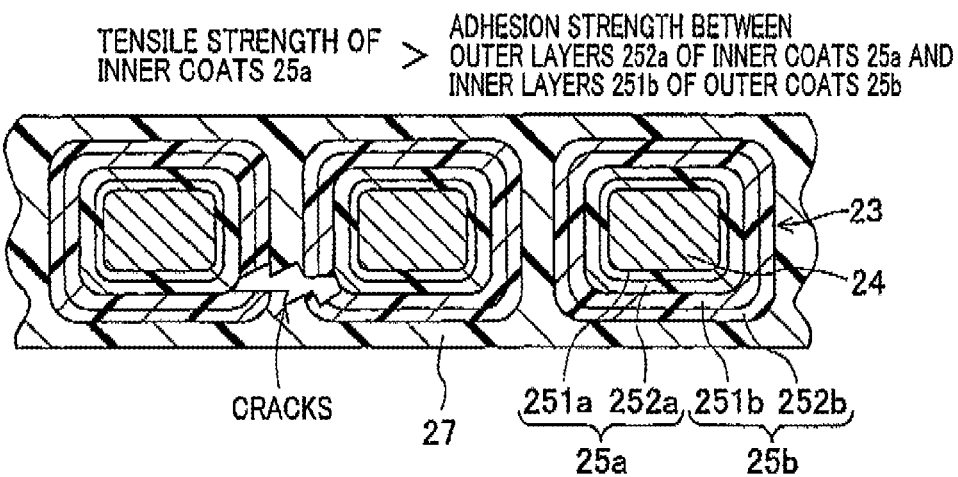
FIG. 29 is a schematic view illustrating the configuration of the electric wire segments according to the tenth embodiment and the varnish applied between the electric wire segments.

As shown in FIG. 29, in the present embodiment, each of the electric wire segments 23 forming the stator coil 21 is configured with an electric conductor 24 and an insulating coat 25 that covers the outer surface of the electric conductor 24. The electric conductor 24 is made, for example, of copper and has a substantially rectangular cross section perpendicular to its extending direction. The insulating coat 25 consists of an inner coat 25a and an outer coat 25b that is formed outside of the inner coat 25a. The inner coat 25a is two-layer structured to include an inner layer 251a and an outer layer 252a, while the outer coat 25b is two-layer structured to include an inner layer 251b and an outer layer 252b.

Each of the Inner and outer layers 251a and 252a of the inner coat 25a has a thickness in the range, for example, of 1 to 10 μm. Each of the inner and outer layers 251b and 252b of the outer coat 25b also has a thickness in the range, for example, of 1 to 10 μm.

The Inner and outer coats 25a and 25b are formed of different insulating materials, while the inner and outer layers 251a and 252a of the inner coat 25a are formed of the same insulating material and the Inner and outer layers 251b and 252b of the outer coat 25b are formed of the same insulating material. More specifically, both the inner and outer layers 251a and 252a of the inner coat 25 are formed, for example, of a polyamide-imide (AI), while both the Inner and outer layers 251b and 252b of the outer coat 25b are formed, for example, of a polyimide (PI).

Moreover, In the present embodiment, the inner and outer layers 251a and 252a of the Inner coat 25a and the Inner and outer layers 251b and 252b of the outer coat 25b are formed in the same way as the insulating coats 25 in the first embodiment. In addition, the adhesion strength between the inner and outer layers 251a and 252a of the inner coat 25, the adhesion strength between the inner and outer coats 25a and 25b, and the adhesion strength between the inner and outer layers 251b and 252b of the outer coat 25b can be easily set to respective desired values by adjusting the baking times and baking temperatures of the inner and outer layers 251a and 252a of the inner coat 25a and the inner and outer layers 251b and 252b of the outer coat 25b.

In the present embodiment, the tensile strength of the inner coats 25a of the electric wire segments 23 is higher than the adhesion strength between the outer layers 252a of the inner coats 25a and the Inner layers 251b of the outer coats 25b of the electric wire segments 23.

Consequently, even if cracks generated in the varnish 27 reach the boundaries between the outer layers 252a of the Inner coats 25a and the inner layers 251b of the outer coats 25b, it is possible to prevent the cracks from further advancing to the outer layers 252a of the inner coats 25a across the boundaries. Thus, the cracks are also prevented from reaching the electric conductors 24 of the electric wire segments 23. As a result, it is possible to reliably prevent a puncture of the insulating coats 25 of the electric wire segments 23 from occurring.

Tenth Comparative Example

Figure 30:
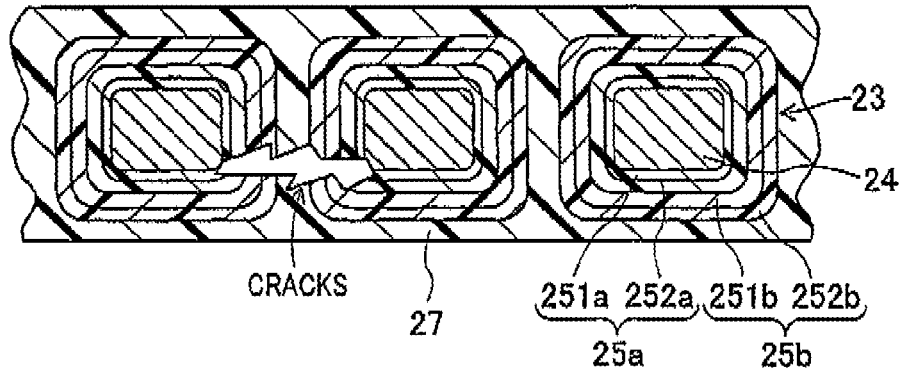
FIG. 30 is a schematic view illustrating the configuration of the electric wire segments according to a tenth comparative example and the varnish applied between the electric wire segments.

FIG. 30 illustrates the configuration of the electric wire segments 23 forming the stator coil 21 according to a tenth comparative example.

As shown in FIG. 30, in this comparative example, the electric wire segments 23 have the same configuration as those in the tenth embodiment except that the tensile strength of the inner coats 25a of the electric wire segments 23 is lower than the adhesion strength between the outer layers 252a of the inner coats 25a and the inner layers 251b of the outer coats 25b of the electric wire segments 23 unlike in the tenth embodiment.

Consequently, in this comparative example, when cracks generated in the varnish 27 reach the boundaries between the outer layers 252a of the inner coats 25a and the inner layers 251b of the outer coats 25b, the cracks will further advance to the outer layers 252a of the inner coats 25a across the boundaries. Thus, in the worst case, the cracks may finally reach the electric conductors 24 of the electric wire segments 23, resulting in a puncture of the insulating coats 25.

[Eleventh Embodiment]

This embodiment illustrates a rotating electric machine which has a similar configuration to the rotating electric machine according to the first embodiment; accordingly, only the differences therebetween will be described hereinafter.

Figure 31:
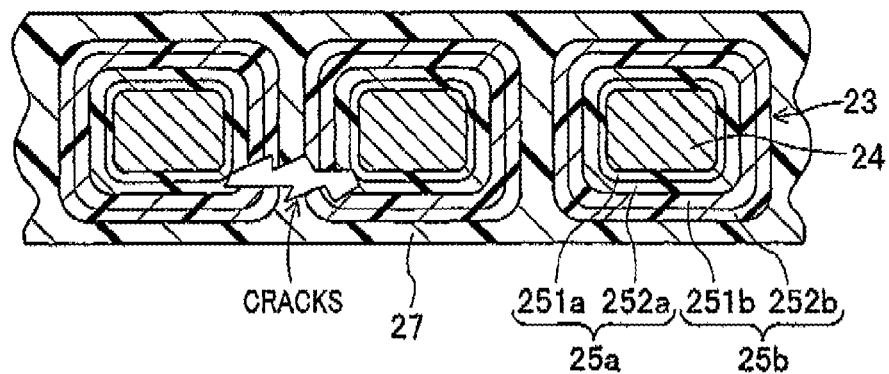
FIG. 31 is a schematic view illustrating the configuration of the electric wire segments according to the eleventh embodiment and the varnish applied between the electric wire segments.

As shown in FIG. 31, in the present embodiment, each of the electric wire segments 23 forming the stator coil 21 is configured with an electric conductor 24 and an insulating coat 25 that covers the outer surface of the electric conductor 24. The electric conductor 24 is made, for example, of copper and has a substantially rectangular cross section perpendicular to its extending direction. The insulating coat 25 consists of an inner coat 25a and an outer coat 25b that is formed outside of the inner coat 25a. The inner coat 25a is two-layer structured to include an inner layer 251a and an outer layer 252a, while the outer coat 25b is two-layer structured to include an inner layer 251b and an outer layer 252b.

Each of the inner and outer layers 251a and 252a of the inner coat 25a has a thickness in the range, for example, of 1 to 10 μm. Each of the inner and outer layers 251b and 252b of the outer coat 25b also has a thickness in the range, for example, of 1 to 10 μm.

The inner and outer coats 25a and 25b are formed of different insulating materials, while the inner and outer layers 251a and 252a of the inner coat 25a are formed of the same insulating material and the inner and outer layers 251b and 252b of the outer coat 25b are formed of the same insulating material. More specifically, both the inner and outer layers 251a and 252a of the inner coat 25 are formed, for example, of a polyamide-imide (AI), while both the inner and outer layers 251b and 252b of the outer coat 25b are formed, for example, of a polyimide (PI).

Moreover, in the present embodiment, the inner and outer layers 251a and 252a of the inner coat 25a and the inner and outer layers 251b and 252b of the outer coat 25b are formed in the same way as the insulating coats 25 in the first embodiment. In addition, the adhesion strength between the inner and outer layers 251a and 252a of the inner coat 25, the adhesion strength between the inner and outer coats 25a and 25b, and the adhesion strength between the inner and outer layers 251b and 252b of the outer coat 25b can be easily set to respective desired values by adjusting the baking times and baking temperatures of the inner and outer layers 251a and 252a of the inner coat 25a and the inner and outer layers 251b and 252b of the outer coat 25b.

In the present embodiment, the tensile strength of the inner coats 25a of the electric wire segments 23 is higher than the adhesion strength between the inner and outer layers 251a and 252a of the inner coats 25a.

Consequently, even if cracks generated in the varnish 27 reach the boundaries between the inner and outer layers 251a and 252a of the inner coats 25a, it is possible to prevent the cracks from further advancing to the inner layers 251a across the boundaries. Thus, the cracks are also prevented from reaching the electric conductors 24 of the electric wire segments 23. As a result, it is possible to reliably prevent a puncture of the insulating coats 25 of the electric wire segments 23 from occurring.

Eleventh Comparative Example

Figure 32:
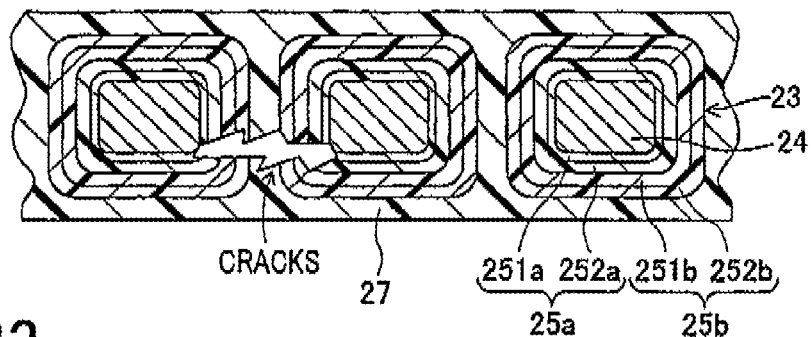
FIG. 32 is a schematic view illustrating the configuration of the electric wire segments according to an eleventh comparative example and the varnish applied between the electric wire segments.

FIG. 32 illustrates the configuration of the electric wire segments 23 forming the stator coil 21 according to an eleventh comparative example.

As shown in FIG. 32, in this comparative example, the electric wire segments 23 have the same configuration as those in the eleventh embodiment except that the tensile strength of the inner coats 25a of the electric wire segments 23 is lower than the adhesion strength between the inner and outer layers 251a and 252a of the Inner coats 25a unlike in the eleventh embodiment.

Consequently, in this comparative example, when cracks generated in the varnish 27 reach the boundaries between the inner and outer layers 251a and 252a of the Inner coats 25a, the cracks will further advance to the inner layers 251a across the boundaries. Thus, in the worst case, the cracks may finally reach the electric conductors 24 of the electric wire segments 23, resulting in a puncture of the Insulating coats 25.

While the above particular embodiments have been shown and described, it will be understood by those skilled in the art that various modifications, changes, and improvements may be made without departing from the spirit of the present invention.

For example, as described above, in the first embodiment, each of the Insulating coats 25 of the electric wire segments 23 is formed of a single insulating material and single-layer structured (see FIG. 10). In the second and third embodiments, each of the Insulating coats 25 of the electric wire segments 23 is formed of a single insulating material and two-layer structured to include the inner and outer layers 251 and 252 (see FIGS. 13 and 15). In the fourth embodiment, each of the insulating coats 25 of the electric wire segments 23 consists of the inner and outer coats 25a and 25b that are formed of different insulating materials and each single-layer structured (see FIG. 17). In the fifth and sixth embodiments, each of the insulating coats 25 of the electric wire segments 23 consists of the inner and outer coats 25a and 25b that are formed of different insulating materials; the inner coat 25a is single-layer structured while the outer coat 25b is two-layer structured to include the inner and outer layers 251b and 252b (see FIGS. 19 and 21). In the seventh and eighth embodiments, each of the Insulating coats 25 of the electric wire segments 23 consists of the Inner and outer coats 25a and 25b that are formed of different insulating materials; the inner coat 25a is two-layer structured to include the inner and outer layers 251a and 252a while the outer coat 25b is single-layer structured (see FIGS. 23 and 25). In the ninth, tenth and eleventh embodiments, each of the insulating coats 25 of the electric wire segments 23 consists of the inner and outer coats 25a and 25b that are formed of different insulating materials; the inner coat 25a is two-layer structured to include the inner and outer layers 251a and 252a while the outer coat 25b is two-layer structured to include the inner and outer layers 251b and 252b (see FIGS. 27, 29 and 31).

However, each of the insulating coats 25 of the electric wire segments 23 may also have other configurations than those according to the first to the eleventh embodiments.

Figure 33:
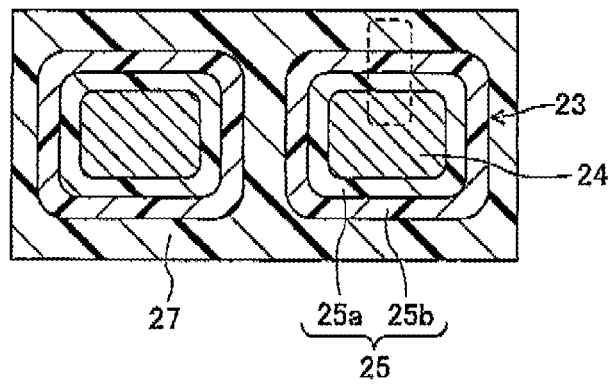
FIG. 33 is a schematic view illustrating the configuration of the electric wire segments according to a first modification and the varnish applied between the electric wire segments.
Figure 34:
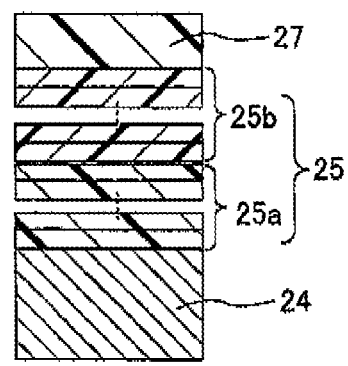
FIG. 34 is an enlarged view of part of FIG. 33.

By way of example, as shown in FIGS. 33 and 34, each of the insulating coats 25 of the electric wire segments 23 may consist of an inner coat 25a and an outer cost 25b that are formed of different insulating materials and each multi-layer structured to include three or more layers. Further, in this case, it is preferable that for each adjacent pair of the layers of the Inner and outer coats 25a and 25b, the tensile strength of that one of the two layers of the pair which is formed inside of the other layer is higher than an adhesion strength between the two layers of the pair.

Figure 35:
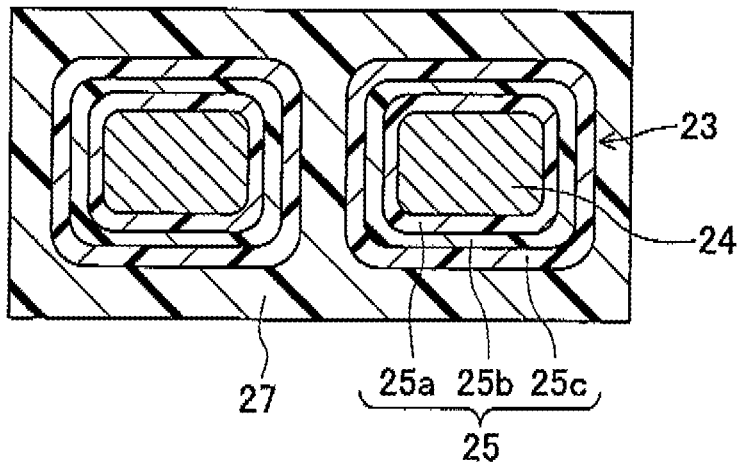
FIG. 35 is a schematic view illustrating the configuration of the electric wire segments according to a second modification and the varnish applied between the electric wire segments.
Figure 36:
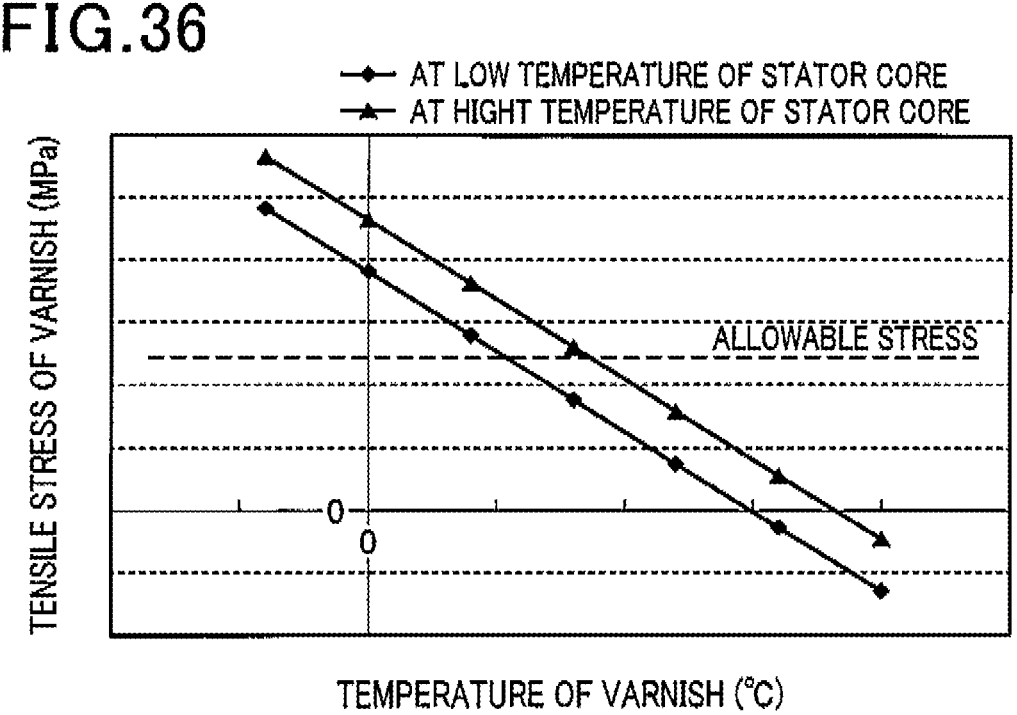
FIG. 36 is a graphical representation illustrating the relationship between the temperature of a varnish applied to first and second coil end parts of a stator coil of a rotating electric machine and the tensile stress induced in the varnish.

Otherwise, as shown in FIG. 35, each of the Insulating coats 25 of the electric wire segments 23 may consist of an inner layer 25a, an Intermediate layer 25b and an outer layer 25c that are formed of different insulating materials. Further, each of the insulating coats 25 of the electric wire segments 23 may also consist of four or more coats that are formed of different insulating materials. In addition, In those cases, each of the coats formed of different materials may be either single-layer structured or multi-layer structured.

In the previous embodiments, the polyamide-imide (AI) and the polyimide (PI) are used as the insulating materials for forming the insulating coats 25 of the electric wire segments 23.

However, other insulating materials, such as PPS (polyphenylene sulfide) or PEEK (polyether ether ketone), may also be used for forming the insulating coats 25. In addition, in the case of using PPS or PEEK, the Insulating coats 25 of the electric wire segments 23 may be formed by extrusion to have a thickness not lower than 10 μm (e.g., 200 μm).

In the previous embodiments, the varnish 27 is implemented by the epoxy resin. However, the varnish 27 may also be implemented by other insulating resins, such as polyester.

In the previous embodiments, the present invention is directed to the automotive alternator 1. However, the Invention can also be applied to other rotating electric machines, such as an electric motor and a motor-generator that can selectively function either as an electric motor or as an electric generator.

What is claimed is:

1. A. rotating electric machine comprising:
a rotor;
a stator including a stator core and a stator coil mounted on the stator core, the stator core having a plurality of slots formed therein, the stator coil being partially received in the slots of the stator core so as to have a pair of coil end parts protruding outside of the slots respectively on opposite axial sides of the stator core, the stator coil being formed of a plurality of electric wire segments that are connected to one other, each of the electric wire segments including an electric conductor and an insulating coat that covers an outer surface of the electric conductor, and
an insulating resin that is applied to the coil end parts of the stator coil so as to cover outer surfaces of the insulating coats of the electric wire segments forming the stator coil, wherein
a tensile strength of the insulating coats of the electric wire segments is higher than an adhesion strength between the insulating resin and the insulating coats,
each of the insulating coats of the electric wire segments is configured to include a plurality of layers each having a particular tensile strength,
at least one of the tensile strengths of the layers is higher than the adhesion strength between the insulating resin and the insulating coats, and
for each adjacent pair of the layers of the insulating coats of the electric wire segments, the tensile strength of that one of the two layers of the pair which is formed inside of the other layer is higher than an adhesion strength between the two layers of the pair.

2. The rotating electric machine as set forth in claim 1, wherein each of the electric wire segments forming the stator coil has a substantially rectangular cross-sectional shape.

3. The rotating electric machine as set forth in claim 1, wherein the stator coil is mounted on the stator core in a distributed winding manner.

4. A rotating electric machine comprising:
a rotor;
a stator including a stator core and a stator coil mounted on the stator core, the stator core having a plurality of slots formed therein, the stator coil being partially received in the slots of the stator core so as to have a pair of coil end parts protruding outside of the slots respectively on opposite axial sides of the stator core, the stator coil being formed of a plurality of electric wire segments that are connected to one other, each of the electric wire segments including an electric conductor and an insulating coat that covers an outer surface of the electric conductor; and
an insulating resin that is applied to the coil end parts of the stator coil so as to cover outer surfaces of the insulating coats of the electric wire segments forming the stator coil,
wherein
each of the insulating coats of the electric wire segments is configured to include an inner coat and an outer coat that is formed outside of the inner coat, and
a tensile strength of the inner coat is higher than an adhesion strength between the inner and outer coats.

5. The rotating electric machine as set forth in claim 4, wherein the inner and outer coats are formed of different insulating materials.

6. The rotating electric machine as set forth in claim 4, wherein each of the electric wire segments forming the stator coil has a substantially rectangular cross-sectional shape.

7. The rotating electric machine as set forth in claim 4, wherein the stator coil is mounted on the stator core in a distributed winding manner.

8. The rotating electric machine as set forth in claim 4, wherein at least one of the inner and outer coats is configured to include a plurality of layers.

9. The rotating electric machine as set forth in claim 8, wherein for each adjacent pair of the plurality of layers, the tensile strength of that one of the two layers of the pair which is formed inside of the other layer is higher than an adhesion strength between the two layers of the pair.

\* \* \* \* \*